(12) United States Patent
Okutsu et al.

(10) Patent No.: US 6,281,636 B1
(45) Date of Patent: Aug. 28, 2001

(54) NEUTRAL-POINT INVERTER

(75) Inventors: Kenzo Okutsu; Koji Ebato, both of Kanagawa-ken; Yoshito Kato, Tottori-ken, all of (JP)

(73) Assignee: Nippo Electric Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/147,423

(22) PCT Filed: Apr. 22, 1998

(86) PCT No.: PCT/JP98/01836

§ 371 Date: Dec. 21, 1998

§ 102(e) Date: Dec. 21, 1998

(87) PCT Pub. No.: WO98/48506

PCT Pub. Date: Oct. 29, 1998

(30) Foreign Application Priority Data

Apr. 22, 1997 (JP) .................................................. 9-104563

(51) Int. Cl.[7] .................................................. H05B 37/02
(52) U.S. Cl. ...................... 315/209 R; 315/224; 315/307
(58) Field of Search .................................. 315/224, 307, 315/209 R; 363/132

(56) References Cited

U.S. PATENT DOCUMENTS 5,502,635 * 3/1996 Bobel .................................... 363/132

FOREIGN PATENT DOCUMENTS

| 58-501348 | 8/1983 | (JP) . |
| 4-193066 | 7/1992 | (JP) . |

* cited by examiner

Primary Examiner—David Vu
(74) Attorney, Agent, or Firm—Nixon Peabody LLP; Donald Studebaker

(57) ABSTRACT

A commercial power supply is connected to a rectifier DB through a low-pass filter LPF. A smoothing capacitor Cs, a series circuit consisting of voltage-dividing capacitors C1 and C2, and a series circuit consisting of switching elements Q1 and Q2 are connected in parallel to the output of the rectifier DB. Diodes D1 and D2 are connected in reverse parallel to the switching elements Q1 and Q2, respectively. A drive circuit DR is connected to the switching elements Q1 and Q2. Between a connecting point that is between the voltage-dividing capacitors C1 and C2 and a connecting point that is between the switching elements Q1 and Q2, a load circuit R consisting of a parallel circuit is connected. The parallel circuit includes an inductor Lo, a fluorescent lamp LT, and a resonance capacitor C4. By turning the switching elements Q1 and Q2 on and off, the inductor Lo is caused to perform a step-up inverter operation, whereby stable high-frequency voltage with a high voltage is generated across both ends of the inductor Lo. As a result, a neutral point inverter capable of generating high-frequency voltage that has a high voltage and less "undulation" can be provided.

10 Claims, 23 Drawing Sheets

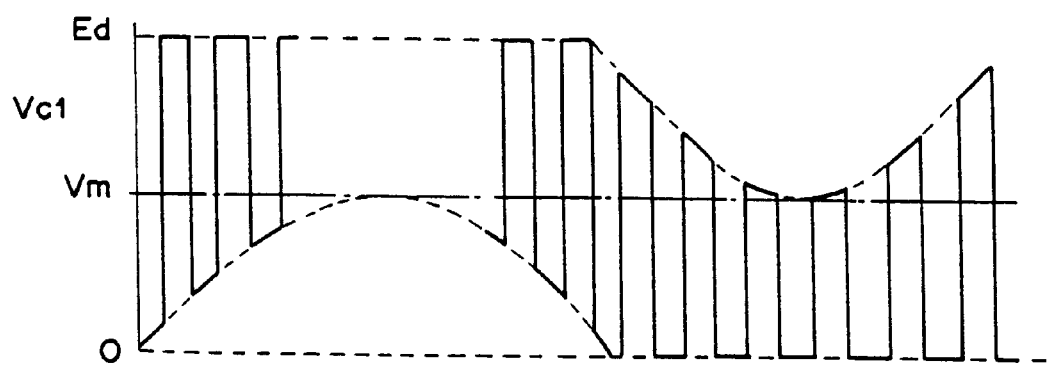
F I G. 2
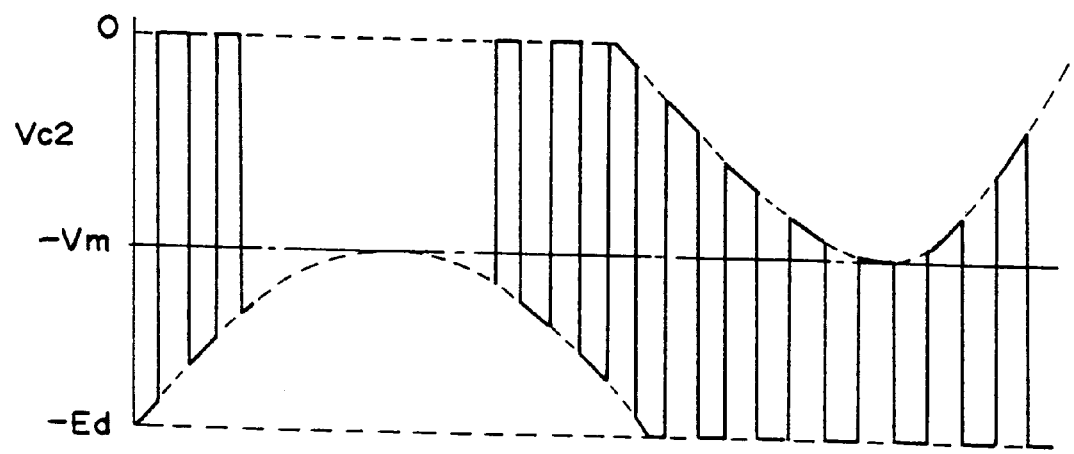
F I G. 3

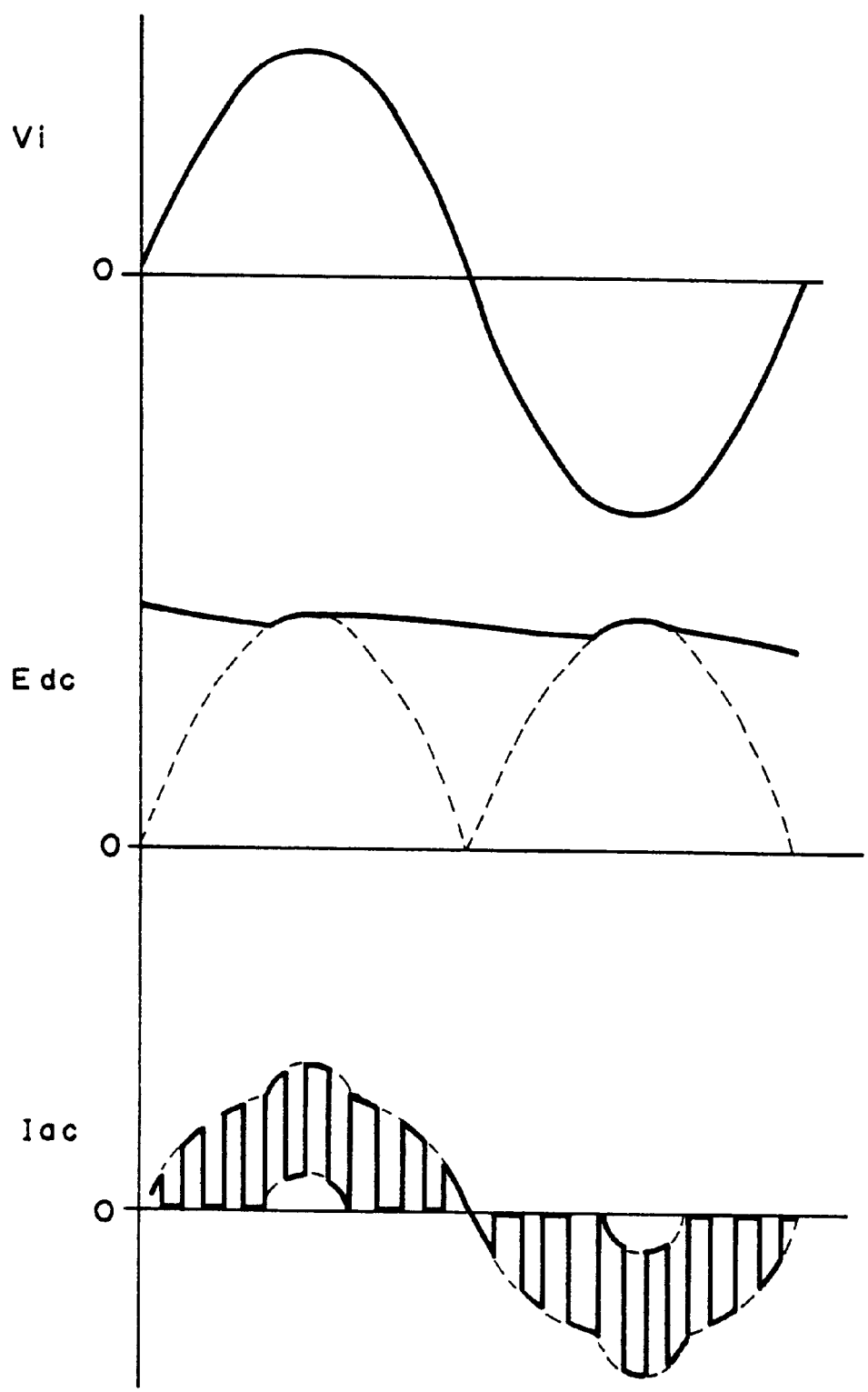
F I G. 24

NEUTRAL-POINT INVERTER

TECHNICAL FIELD

The present invention relates to an inverter that rectifies and smooths alternating voltage, to convert it to a direct-current voltage, and then convert it to a high-frequency voltage, to supply high-frequency power across load. More particularly, the invention relates to a neutral point inverter, or a neutral point inverter type ballast suitable for lighting equipment.

BACKGROUND ART

In recent small-sized domestic products and office automation (OA) equipment, high-frequency inverters have been mounted for achieving high performance and high efficiency.

Also, in fluorescent lamp appliances for homes and fluorescent lamp appliances for facilities, a copper-iron type ballast, such as a choke current-limiting type, a leakage transformer type or the like, has hitherto been used as a circuit system that drives a fluorescent lamp. However, since it has limitations on the aspects of shape, weight, and efficiency, a lamp controller called a high frequency lighting type ballast (inverter type ballast) comes into use in the present fluorescent appliances, and is also being used in HID lamp (mercury lamp, metal halide lamp, etc.) appliances, bulb type fluorescent lamps, etc.

This inverter type ballast has advantages in that it has high efficiency and is able to save electric power, and it is also able to reduce lamp flickering and ballast noise, and furthermore, it is able to reduce its weight. For these reasons, inverter control of the above-mentioned fluorescent lamp appliances has made rapid progress.

However, in the above-mentioned high-frequency inverter or inverter type ballast (hereinafter referred to as an "inverter"), a capacitor smoothing circuit method for full-wave rectification, which employs rectifiers (diodes) and performs smoothing with an electrolytic capacitor, is often used, and distorted-wave current resulting from diode non-linearity flows in a commercial power supply.

For that reason, a harmonic component (harmonic current) flows in an input current on the side of a commercial power supply. The problem of failure (harmonic failure) that is affected by this harmonic current has become significant.

For this reason, circuit techniques for suppressing harmonic current have been studied and investigated. For instance, an AC reactor insertion method, a partial smoothing method, an active smoothing filter method (see "Inverter Fluorescent Lamp," Electronic Technique, Vol.32, No.3, pp.113–119), a dither rectifying method (see "High Power-Factor Switching Regulator Employing Dither Effect," National Convention Lecture Thesis Collection of Electric Society, No. 546, pp. 5–137), etc., have been proposed.

Furthermore, as an electronic ballast for fluorescent lamps, a neutral-point electronic ballast circuit has been proposed in which a reduction in the harmonic component of an input current on the side of a commercial power supply is performed with only an inverter for lighting a fluorescent lamp, as in the dither rectifying method (see Yoshihito Kato, "One Method of a Simple Harmonic Reduction Circuit," Electrical Equipment Society Journal, Vol. 12, No. 10, pp. 902–904). A study of the theoretical analysis of this neutral-point electronic ballast circuit (neutral point inverter type ballast) has also been made (see Yoshihito Kato, "Development of an Input Current Low-Distortion Type Electronic Ballast by a Neutral Point Inverter," Illumination Society Journal, Vol. 79, No. 2, pp. 14–20).

This neutral point inverter type ballast has many advantages in that (1) by inserting a low-pass filter LPF in the side of a commercial power supply, a reduction in the harmonic component contained in an input current is possible with only an inverter for lighting a fluorescent lamp, as in the active smoothing filter method, (2) there is no need to make a new circuit as in the dither rectifying method, and this ballast is applicable to an improvement in the existing half-bridge ballast, (3) the harmonic component of an input current can be reduced to less than IEC standard (IEC 1000-3-2), (4) for an input power factor, a high power factor of 97% or more is obtained, (5) circuit constitution is simple and also a reduction in the luminous efficiency of the lamp is low, and soon. For these reasons, the neutral point inverter type ballast is being used as a suitable circuit that prevents the harmonic failure of an inverter.

FIG. 19 is a basic circuit diagram of a neutral point inverter. This circuit consists of a full-wave rectifier DB that rectifies a commercial power supply Vi to direct-current voltage Ed through a low-pass filter LPF (the constituent diodes in the circuit diagram are represented simply as 1 through 4, and in the specification, they are referred to as DB1 through DB4.), a smoothing capacitor Cs that smooths the output of the full-wave rectifier DB, a series circuit that is connected in parallel with the smoothing capacitor Cs and also consists of voltage-dividing capacitors C1 and C2 for dividing direct-current voltage Ed, a series circuit consisting of switching elements Q1 and Q2 connected in parallel with the smoothing capacitor Cs, and load RL connected between the connecting point which is between the voltage-dividing capacitors C1 and C2 (hereinafter referred to as a "neutral point") and the connecting point which is between the switching elements Q1 and Q2 (hereinafter referred to as a "SW point"). The neutral point is connected to one end of a commercial power supply Vi.

For the operation of this circuit, the ripple voltage included in the output of the full-wave rectifier DB is converted to direct-current voltage Ed with the smoothing capacitor Cs. Then, the switching elements Q1 and Q2 are turned on or off to constitute a closed circuit that includes the neutral point. With the closed circuit, the voltage-dividing capacitor C1 or C2 is charged from the smoothing capacitor Cs. This charging current becomes load current that flows in the load RL, and reverse current is ensured for an interval during which no load current flows. If the switching elements Q1 and Q2 are alternately turned on and off (inverting operation), voltage VL with a high frequency superposed on a commercial frequency will be applied across the load RL. Since the current through the diodes DB1 through DB4 has a triangular high frequency with a quiescent interval proportional to load, the current is passed through the low-pass filter LPF to obtain a false sine current waveform. This makes a reduction in the harmonic component of the input current on the commercial power supply possible.

FIG. 20 is a circuit diagram of the case where a fluorescent lamp LT is employed as the load of a neutral point inverter, this circuit being called a neutral point inverter type ballast. Since the load voltage VL that is obtained with only the basic circuit (FIG. 19) is a charging-discharging (particularly charging) waveform from both the switching elements Q1 and Q2 and the voltage-dividing capacitors C1 and C2, the load voltage VL is unsuitable for lighting of the fluorescent lamp LT. In order to remove this transient portion and in order to make the lamp current a sine wave, a series circuit, which consists of an inductor L1 and a fluorescent lamp LT, is connected to the load terminal of the basic circuit (between the neutral point and the SW point), and a resonance capacitor is connected in parallel with the fluorescent lamp LT so that it resonates with the fluorescent lamp LT. This circuit constitution (load circuit) is the circuit shown in FIG. 20 (hereinafter referred to as an "implementation circuit"). A description will hereinafter be given of the operation of this implementation circuit. When a smoothing capacitor Cs has a sufficiently larger value than voltage-dividing capacitors C1 and C2 (Cs>>C1, C2), the voltage of the maximum value Vm of an input voltage (Vi=Vm·sin (wt)) is obtained across the smoothing capacitor Cs (Vm= Ed). This is because although the rectifier DB and the voltage-dividing capacitors C1 and C2 apparently constitute a voltage doubler circuit, the influence of C1 and C2 becomes negligible if Cs is sufficiently larger than C1 and C2 and therefore a voltage doubler circuit is not constituted.

Therefore, in a steady state which performs an inverting operation, if it is assumed that voltages across the voltage-dividing capacitor C1 and across the capacitor C2 are respectively $V_{C1}$ and $V_{C2}$, the voltage Ed across the smoothing capacitor Cs is expressed as follows:

$$Ed=V_{C1} \text{ and } V_{C2}$$

On the other hand, in this implementation circuit, with the on-off operation of the switching elements Q1 and Q2, charging-discharging current flows in both the voltage-dividing capacitors C1 and C2 and the smoothing capacitor Cs. Also, when an input voltage Vi is Ed<|Vi|, charging current from a commercial power supply is superposed on the smoothing capacitor Cs, and the input current Ii has approximately a so-called capacitor-input current waveform. Therefore, it is considered that the input current Ii has a pointed waveform.

With this, the waveforms of the voltages $V_{C1}$ and $V_{C2}$ across the voltage-dividing capacitors C1 and C2 become waveforms such as those shown in FIGS. 21 and 22, respectively. Also, the voltage VR that is generated in a load circuit R becomes a composite waveform such as that shown in FIG. 23, in which FIGS. 21 and 22 showing the voltage waveforms across the voltage-dividing capacitors C1 and C2 are superposed with alternating current zero as a boundary. Note that since FIG. 23 has been simplified, the actual voltage VR is one in which high-frequency voltages from the maximum of $V_{C1}$ to the minimum of $V_{C2}$ are applied to the load circuit R.

Next, examine the input current Ii. As evident in the above-mentioned description, in the time period while Ed<|Vi|, a current for charging the smoothing capacitor Cs flows in the smoothing capacitor Cs. This charging current goes to a greater value, unlike current flowing in the voltage-dividing capacitors C1 and C2, depending upon the states of the switching elements Q1 and Q2 in the time period while 0<|Vi|<Ed.

With this, if the waveform of the input current Ii is shown in a figure, it becomes an intermittent current interrupted by the switching elements Q1 and Q2. The input current Ii also has a current waveform which becomes discontinuous at a position in which the input voltage Vi crosses zero, the current waveform having a peak such as that shown in FIG. 24. Therefore, if the low-pass filter LPF for passing a commercial frequency is inserted in an input, a current waveform which is nearly a sine wave will be obtained and therefore high-frequency current will be prevented from flowing in a commercial power supply. However, slight wave distortion is produced by the peak current. For this reason, there is a need to select an optimal smoothing capacitor Cs so that this peak current is reduced.

The above-mentioned description has been made with reference to the case where the voltage Ed across the smoothing capacitor Cs is based on perfect direct current. Actually, the voltage Ed across the smoothing capacitor Cs, has a ripple voltage Vpp, so that the voltage waveforms across the voltage-dividing capacitors C1 and C2 and the current waveform of the input current Ii become waveforms such as those shown in FIG. 25. Therefore, the voltage VR that is generated in the load circuit R has an uneven voltage waveform with both a maximum peak Vmax and a minimum peak Vmin, such as that shown in FIG. 26. Note that in FIG. 25, the voltages $V_{C1}$ and $V_{C2}$ are superposed and shown with alternating current zero as a boundary.

Notice that, as described above, in the neutral point inverter, by performing DCM (discontinuous mode) operation in which the input current Ii becomes a discontinuous current, there is no need to add an exclusive control circuit, which is required for preventing voltage rise during light load by other methods that perform CM (reactor current mode) or CRM (boundary mode) operation (e.g., an active filter circuit, etc.), unlike the neutral point inverter. Therefore, the neutral point inverter has the advantage that its circuitry becomes structurally simple.

For instance, the method that performs CM operation requires a detection-control circuit for detecting and controlling a position in which current flowing in an inductor does not go to zero. The method that performs CRM operation requires a detection-control circuit for detecting a position in which current through an inductor goes to zero and also detecting an output voltage to perform feedback control. On the other hand, the neutral point inverter does not require these exclusive circuits, and there is no possibility that voltage will rise so significantly even during light load. The voltage rise during light load has an influence upon the withstand voltage of used components, particularly an electrolytic capacitor for the smoothing capacitor CS, and switching elements such as field-effect transistors (FETs). For this reason, particularly in the case where a fluorescent lamp is used in the load, this state will occur each time the lighting of the fluorescent lamp is started and therefore what mode the input current Ii goes to is important.

Incidentally, to maintain stable lighting of a fluorescent lamp, the secondary voltage of a ballast is designed which is able to light the fluorescent lamp even under changes in external factors, such as fluorescent lamp characteristic dispersion, surrounding temperature and humidity change, and power-supply voltage fluctuation. On the other hand, in an independent ballast, for the wiring of a specific site of 300 V or less the code wiring is possible, whereas the secondary voltage that is high causes a disadvantage of wiring cost, and problems, such as an increase in the size of the ballast, safety, or a cold start countermeasure of a fluorescent lamp, will arise. Furthermore, in the case of a ballast sharing a plurality of fluorescent lamp types, such as slim-line fluorescent lamps, particularly a high-frequency secondary voltage design of low voltage which is able to reliably light lamps is required. For ordinary fluorescent lamps themselves, many narrow or long fluorescent lamps have also been used in recent years. This necessitates a high fluorescent lamp voltage. For example, in slim-line fluorescent lamps, the fluorescent lamp voltage is about 150 V, even for an intermediate size lamp (about 1 m), and in a normal state, an input voltage with an effective value of 200 V is required. Recently, with the spread of high-speed semiconductor sensors such as video displays, there is also a strong demand for a light source with less blinking. From these facts, a large difference between the maximum peak Vmax and minimum peak Vmin of the voltage supplied across a fluorescent lamp is disadvantageous. In consideration of efficiency, it is desirable that a fluorescent lamp be lit with even high-frequency voltage.

On the other hand, if the input voltage Vi does not require a 100-V system but a 200-V system, this means that an ordinary commercial power supply (100 V) cannot be used as it is. For this reason, there is a need to step up voltage with a transformer, etc., and handling becomes difficult. Also, the problem of safety will arise.

In addition, in the above-mentioned neutral point inverter, by inserting the low-pass filter LPF in the input thereof, an input current waveform is made approximately a current waveform which is nearly a sine wave, whereby harmonic current is prevented from flowing in a commercial power supply. However, there is a problem that the allowable range of the capacitance of the smoothing capacitor Cs is narrow and therefore there is no degree of freedom in selection.

The present invention has been made in view of the above-mentioned circumstances. Accordingly, it is an object of the present invention to provide a neutral point inverter type ballast or a neutral point inverter which is capable of obtaining a higher output and even (i.e., stable) output voltage and thereby rendering a reduction in an input voltage possible, while holding the characteristics of the neutral point inverter.

SUMMARY OF THE INVENTION

A first neutral point inverter according to the present invention comprises: a low-pass filter for passing a basic frequency of alternating current and filtering out a harmonic signal; a rectifier for rectifying alternating voltage passed through the low-pass filter; a series circuit consisting of first and second capacitors connected to an output of the rectifier; a third capacitor for smoothing the output of the rectifier; a series circuit consisting of first and second switching elements connected to the output of the rectifier; first and second diodes connected in parallel to the first and second switching elements so that direct current through the first diode and direct current through the second diode become opposite in direction (such a connection is referred to as a "reverse parallel connection"); a drive circuit for driving the first and second switching elements; and a load circuit connected between a connecting point (neutral point) which is between the first and second capacitors and a connecting point (SW point) which is between the first and second switching elements, the connecting point between the first and second capacitors being connected to an alternating current input of the rectifier, and alternating current power being supplied to the load circuit by alternating turning on and off the first and second switching elements. In the first neutral point inverter, the load circuit includes an inductor and load connected in parallel with the inductor, the alternating current power being supplied across the load by voltage that is generated across the inductor.

A second neutral point inverter according to the present invention comprises: a low-pass filter for passing a basic frequency of alternating current and filtering out a harmonic signal; a rectifier for rectifying alternating voltage passed through the low-pass filter; a series circuit consisting of first and second capacitors connected to an output of the rectifier; a third capacitor for smoothing the output of the rectifier; a series circuit consisting of first and second switching elements connected to the output of the rectifier; first and second diodes connected in parallel to the first and second switching elements so that direct current through the first diode and direct current through the second diode become opposite in direction; a drive circuit for driving the first and second switching elements; and a load circuit connected between a connecting point (neutral point) which is between the first and second capacitors and a connecting point (SW point) which is between the first and second switching elements, the connecting point between the first and second capacitors being connected to an alternating current input of the rectifier, and alternating current power being supplied to the load circuit by alternating turning on and off of the first and second switching elements. In the second neutral point inverter, the load circuit includes a series circuit, which consists of an inductor and a fourth capacitor, and load connected in parallel with the inductor, the alternating current power being supplied across the load by voltage that is generated across the inductor.

In the above-mentioned first and second neutral point inverters, it is desirable that the inductor be a primary winding of a transformer and that the load be connected to a secondary winding of the transformer. It is also desirable that the primary winding of the transformer be connected to one of the connecting points through a second inductor. Furthermore, it is desirable that the inductor be a take-out winding of an autotransformer connected between the two connecting points.

Here, the "take-out winding" means a winding that is formed between one of the terminals of the autotransformer and a predetermined take-out winding of the autotransformer.

In the above-mentioned first and second neutral point inverters, in order to prevent a reduction in the ability of the first and second switching elements which supplies electric power across the inductor, it is desirable that a zero-cross detection circuit for detecting an intersection of alternating current zero of load current be connected between one end of the secondary winding of the transformer. It is also desirable that a connecting point between the zero-cross detection circuit and the load be connected to one end of an output of the rectifier and that the drive circuit drive the first and second switching elements, based on the output of the zero-cross detection circuit.

In addition, in order to prevent the constituent elements of the inverter from being broken down when the load circuit is in an abnormal condition, it is desirable that the neutral point inverter further comprise a second transformer with a primary winding thereof connected between the load and the transformer. It is desirable that the drive circuit detect voltage, which is generated across the secondary winding of the second transformer, and stop operation of the first and second switching elements when the voltage is outside a predetermined range. When the neutral point inverter further comprises a second transformer with a primary winding thereof connected between the load and the transformer, it is also desirable that the drive circuit detect current, which flows in the secondary winding of the second transformer, and stop operation of the first and second switching elements when the current is outside a predetermined range. Furthermore, it is desirable that the neutral point inverter further comprise a snubber circuit connected in parallel with either one or the other of the first and second switching elements. The snubber circuit absorbs abnormal voltage that is generated at the connecting point between the first and second switching elements. The voltage generated in the snubber circuit is detected, and when the voltage is outside a predetermined range, the drive circuit stops operation of the first and second switching elements.

Furthermore, in order to prevent the constituent elements of the inverter from being broken down during an abnormal condition and in order to reduce power dissipation, it is desirable that the neutral point inverter further comprise: a start circuit for supplying direct-current voltage rectified by the rectifier to the drive circuit only for a time period during which a predetermined time elapses since the alternating voltage was applied to the inverter; a direct-current voltage generating circuit for supplying direct-current voltage to the drive circuit, the direct-current voltage being obtained by rectifying high-frequency voltage which is generated in the load circuit by an on-off operation of the first and second switching elements; and a drive stop circuit for stopping the on-off operation of the first and second switching elements when the direct-current voltage obtained by the direct-current voltage generating circuit is outside a predetermined voltage range.

Moreover, in the case where a fluorescent lamp is employed as a load, it is desirable that the transformer has a tap at a predetermined winding position. It is also desirable that one end of a filament of the fluorescent lamp be connected the tap so that the filament can be preheated.

While a conventional neutral point inverter is constructed so that an inductor and a load circuit are connected between a neutral point and a SW point, the neutral point inverter according to the present invention is constructed so that an inductor is connected between the neutral point and the SW point and also high-frequency power is applied across this inductor. Therefore, it becomes possible to operate the neutral point inverter of the present invention as a step-up inverter by the counter-electromotive force of the inductor. With this step-up inverter operation, a high-frequency voltage of about twice the conventional neutral point inverter can be obtained across both ends of the inductor. In addition, the high-frequency voltage that is obtained becomes one in which the difference between the maximum peak Vmax and the minimum peak Vmin is small, and high-frequency voltage stable at a voltage higher than the conventional neutral point inverter is obtained. For this reason, in a load circuit that requires application of high-frequency voltage at a high voltage (e.g., the case where a fluorescent lamp is lit with a high voltage), high-frequency voltage at a high voltage can be applied to a load circuit by employing commercial voltage as it is, although the conventional neutral point inverter steps up voltage using a transformer and the like because it requires a greater voltage than a commercial voltage (100 V) as an input voltage. With this, handling of an input power supply becomes easy and also the neutral point inverter itself can be reduced in size.

Also, since high-frequency current has the characteristics of the neutral point inverter as they are, it is sufficiently applicable for preventing harmonic failure of an input current.

Furthermore, in the conventional neutral point inverter, while the allowable width of the constant of the smoothing capacitor for preventing peak current and producing an optimal harmonic current waveform is narrow, in the neutral point inverter according to the present invention no peak current flows. Since the allowable width of the setting of the constants of the smoothing capacitor waveform is wide, a smaller capacitor is used in consideration of ripple voltage and the like, whereby the miniaturization of the inverter can also be achieved.

In addition, if a capacitor is connected in series with an inductor, the capacitor can absorb voltage by the counter-electromotive force of the inductor. Therefore, the step-up inverter operation is alleviated and effect to step up voltage can be reduced. For this reason, even if an input voltage is doubled, approximately the same output voltage as the case where the above-mentioned capacitor is not connected is obtained. As a result, the inverter according to the present invention can easily cope with a switch in input voltage.

Also, in the neutral point inverter according to the present invention, a transformer with a secondary winding can be employed. By setting a winding ratio in accordance with the high-frequency voltage that a load circuit requires, a desired high-frequency voltage can be obtained without any change in the primary winding. Furthermore, since the secondary winding can be isolated from the primary side, the inverter can be constructed so as to also be superior in safety. Moreover, the electric power supplied across the primary winding of a transformer (primary inductor) can be effectively transmitted to the secondary side.

Furthermore, in the case where a load circuit does not particularly require a high voltage, the heat generation in the transformer can be prevented, by connecting an inductor in series with the transformer.

Also, in this case, the high-frequency voltage supplied to a load circuit can be reduced with an autotransformer. Furthermore, in the case where the same output voltage is obtained, a smaller transformer than the aforementioned transformer having a secondary winding can be used. As a result, the neutral point inverter can be further reduced in size.

In addition, in the neutral point inverter employing the above-mentioned transformer that has a secondary winding, a reduction in ability to supply electric power across an inductor due to load fluctuation can be prevented, by detecting the intersection of the alternating current zero of load current. Therefore, ideal high-frequency voltage can be generated across the inductor, and a more efficient neutral point inverter can be constructed.

Additionally, if a predetermined detection circuit is constructed so as to detect an abnormal condition in current through a load circuit or voltage across the load circuit, constituent elements of the inverter can be prevented from being broken down when the load circuit is in an abnormal condition.

Furthermore, if the inverter is equipped with a start circuit that operates the inverter only when power is turned on, and a DC voltage generating circuit that operates the inverter with direct-current voltage obtained by rectifying high-frequency voltage, and furthermore a drive stop circuit, then the inverter can be operated with voltage supplied from the DC voltage generating circuit only when the inverter is in a steady state. As a result, the inverter can be automatically stopped during abnormality. In addition, since there is no need to supply electric power to the drive circuit through a drop resistor, power dissipation during a steady state can be reduced.

Moreover, in the case where a fluorescent lamp is used as load, preheating of the filament of the fluorescent lamp can be easily performed, by providing a tap at a predetermined winding position on a transformer (including an autotransformer) and connecting this tap and the filament together. Therefore, since electric power before lighting of the lamp can be supplied as electric power for preheating the filament, the filament can be rapidly preheated, and after lighting of the lamp, target preheating power can be automatically obtained with power to the lamp. In this way, the low-voltage design of the secondary voltage in a neutral point inverter type ballast becomes possible.

BRIEF DESCRIPTION OF THE DRAWINGS

FIG. 2 is a voltage waveform diagram of a first capacitor in the above-mentioned equivalent circuit of the above-mentioned neutral point inverter;

FIG. 3 is a voltage waveform diagram of a second capacitor in the above-mentioned equivalent circuit of the above-mentioned neutral point inverter;

FIG. 24 is an input current waveform diagram of the above-mentioned neutral-point inverter type ballast;

BEST MODE FOR CARRYING OUT THE INVENTION

Figure 1:
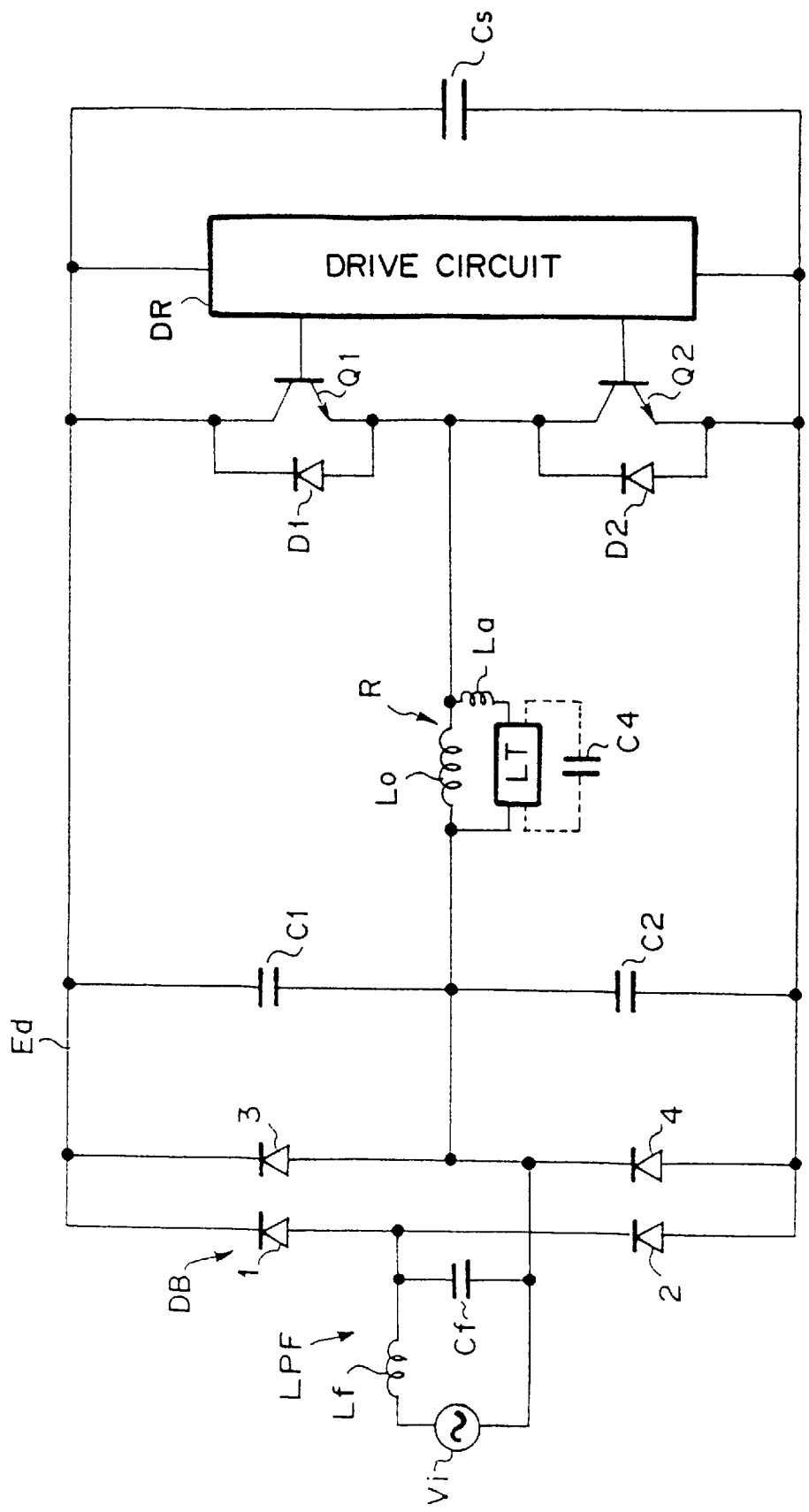
FIG. 1 is a circuit diagram of a neutral point inverter according to a first embodiment of the present invention.

Embodiments of the present invention will hereinafter be described in detail in reference to the drawings. FIG. 1 is a circuit diagram of a neutral point inverter that is a first embodiment of the present invention, and constitutes an inverter type ballast that lights a fluorescent lamp LT.

A commercial power supply is connected to the AC input terminal of a full-wave rectifier DB through a low-pass filter LPF which is constructed of an inductor Lf and a capacitor Cf. A series circuit, which consists of two capacitors C1 and C2 with a small capacitance, and a series circuit, which consists of first and second switching elements (transistors) that are alternately turned on and off by a drive circuit DR, are connected to the DC output terminal of the full-wave rectifier DB in parallel with a smoothing capacitor Cs that smooths the output of the rectifier DB. First and second diodes D1 and D2 are connected to the switching elements Q1 and Q2 in reverse parallel, respectively. One end of the AC input terminal of the rectifier DB is also connected to the connecting point (neutral point) between the capacitors C1 and C2.

A load circuit is constructed of an inductor Lo and a fluorescent lamp LT. The inductor Lo is connected between the neutral point and the connecting point (SW-point) that is between the switching elements Q1 and Q2. A series circuit, which consists of the fluorescent lamp LT and an inductor La functioning as a choke coil, is connected in parallel to the conductor Lo. Furthermore, a resonance capacitor C4 is constructed so that it can be connected in parallel to the fluorescent lamp LT as occasion demands. When the resonance capacitor C4 is connected, the inductor Lo and the resonance capacitor C4 constitute a parallel resonance circuit, and the resonance voltage that is generated across the resonance capacitor C4 is applied across the fluorescent lamp LT. In the case where a load other than the fluorescent lamp LT is used, it is also possible to connect the load directly to the inductor Lo in parallel without connecting the inductor La.

A description will hereinafter be given of the operation of the circuit with the above-mentioned constitution. As with a conventional neutral point inverter, charging-discharging current flows in the voltage-dividing capacitors C1 and C2 and the smoothing capacitor Cs by the on-off operation of the switching elements Q1 and Q2.

Also, when one of the switching elements is on and the other is off, current flows in the inductor Lo and energy is accumulated in the inductor Lo.

Next, if both switching elements Q1 and Q2 are turned off, the smoothing capacitor Cs is charged with the energy stored up to that time in the inductor Lo, through the diodes D1 and D2 connected in reverse parallel to the switching elements Q1 and Q2. As a result, the smoothing capacitor Cs is raised to about 2 Vm.

As a result, the voltage waveforms across the voltage-dividing capacitors C1 and C2 become waveforms such as those shown in FIGS. 2 and 3, respectively (however, the waveform varies with the values of the inductor Lo, voltge-dividing capacitors C1 and C2, etc.).

Figure 4:
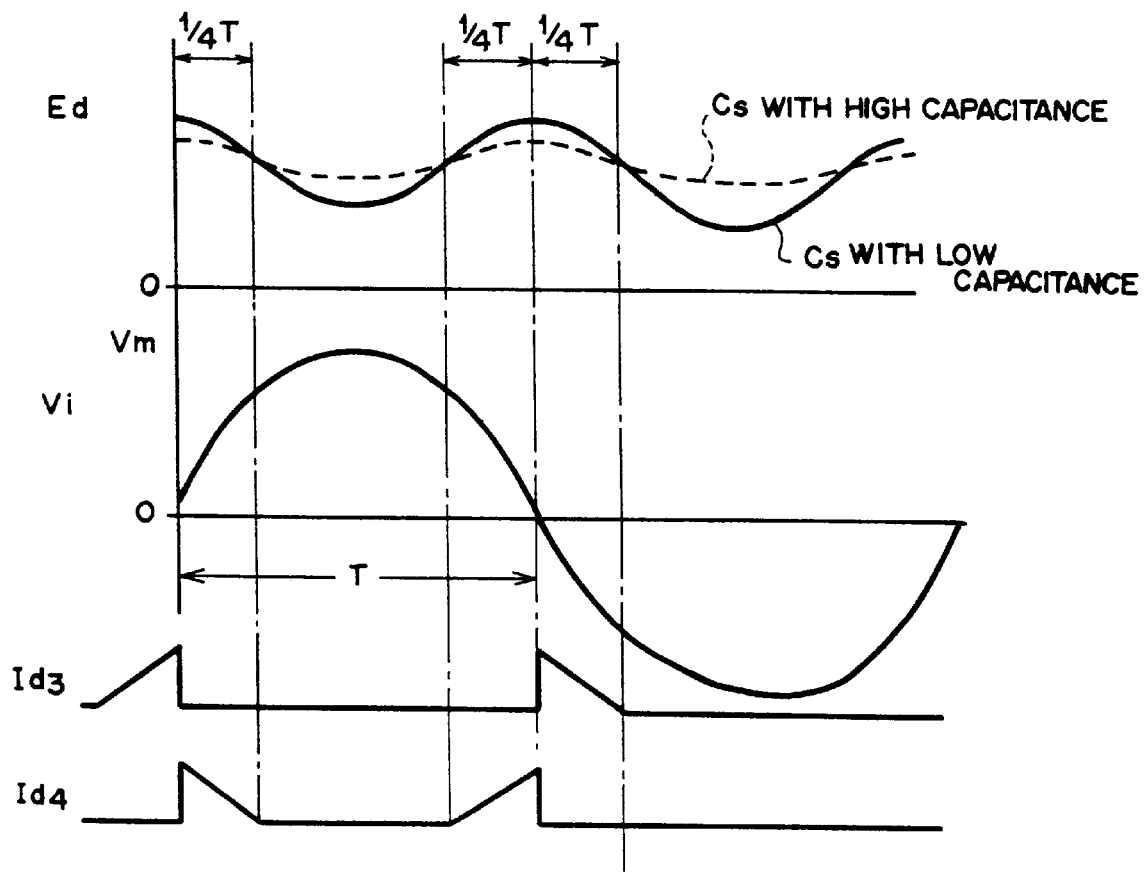
FIG. 4 is a voltage waveform diagram of a smoothing capacitor in the above-mentioned equivalent circuit of the above-mentioned neutral point inverter.

The above-mentioned description has been given with reference to the case where the voltage Ed across the smoothing capacitor Cs is based on perfect direct current. Actually, the voltage Ed across the smoothing capacitor Cs has a ripple voltage (this situation is shown in FIG. 4, corresponding to an input voltage Vi.). For this reason, the diodes constituting the rectifier DB are not all turned on. The diodes DB3 and DB4 are turned on only for intervals of ¼ T near 0 V of the input voltage Vi, so currents (Id3 and Id4) flow in the diodes. The remaining diodes are turned off, so there is an interval during which no current flows in the diode.

Also, as is clear from FIG. 4, the ON intervals of the diodes DB3 and DB4 constituting the rectifier DB are hardly changed by the magnitude of the ripple voltage. That is, the AC component of the ripple voltage crosses at the identical time regardless of the capacitance of the smoothing capacitor Cs. At this time, the frequency of the ripple voltage becomes twice the frequency of the input voltage Vi.

Note that thus having the intervals during which the diodes DB3 and DB4 are on is the characteristic of the neutral point inverter and this is the point which differs from a mere voltage doubler rectifier. When DB3 and DB4 are on, the constitution is the same as the aforementioned description. When DB3 and DB4 are off, the constitution is equivalent to a constitution excluding these. In this case, a voltage doubler rectifier is apparently constituted.

Figure 5:
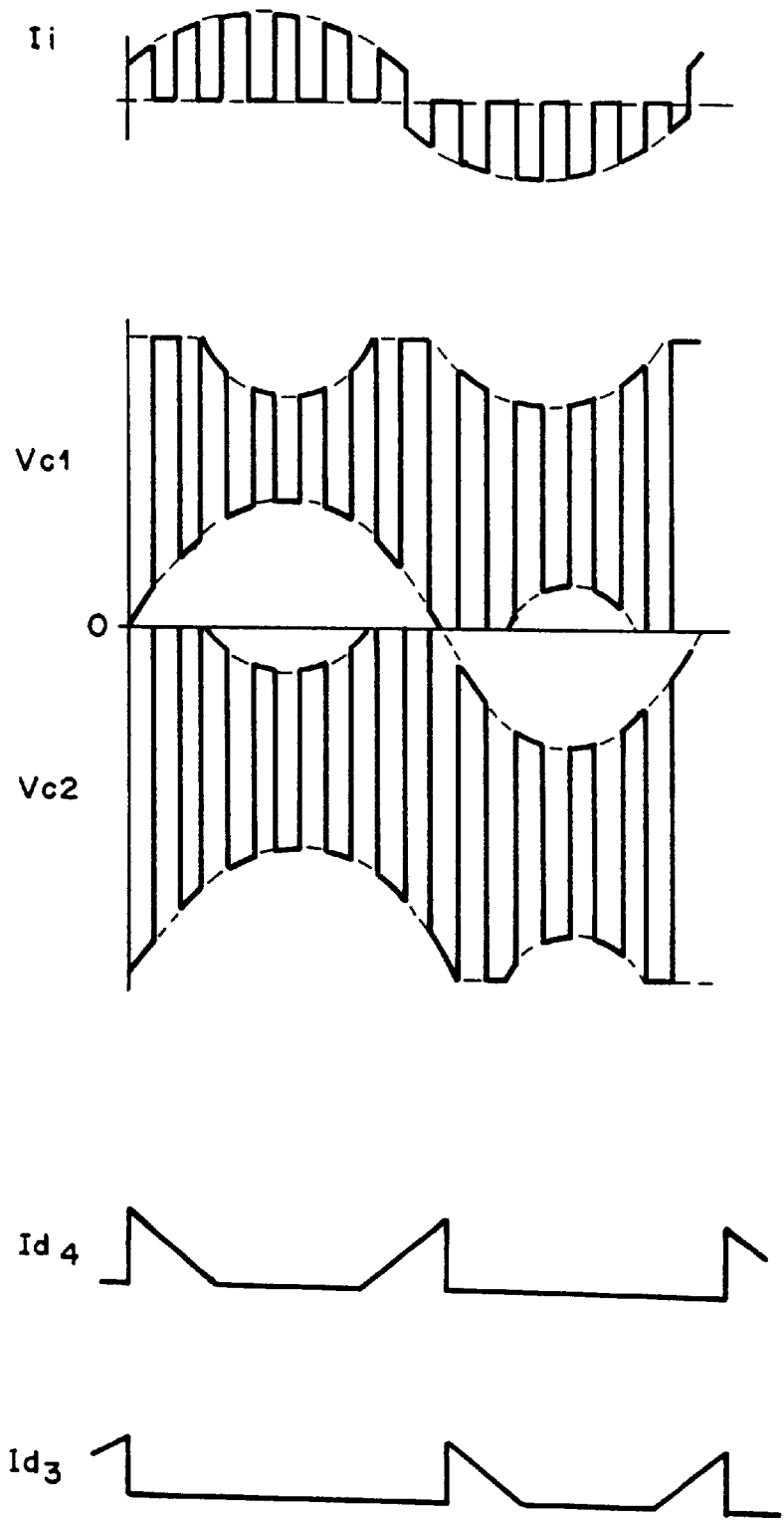
FIG. 5 is a voltage waveform diagram of first and second capacitors in the above-mentioned equivalent circuit of the above-mentioned neutral point inverter (actual waveforms)
Figure 6:
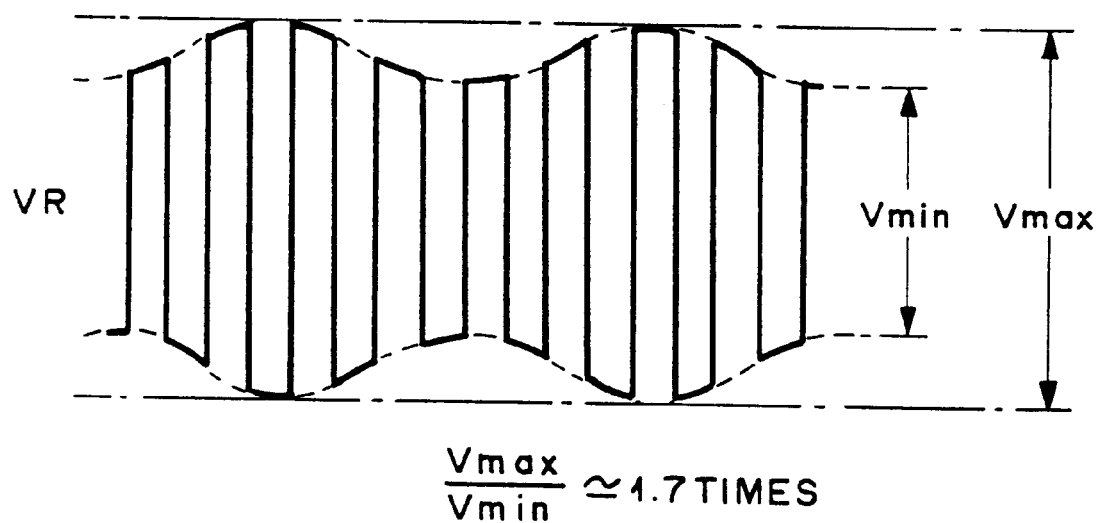
FIG. 6 is a voltage waveform diagram of load in the above-mentioned neutral point inverter.

At this time, because of the voltage drops across the voltage-dividing capacitors C1 and C2, the voltage Ed across the smoothing capacitor Cs will vary up and down, depending upon the capacitances of the voltage-dividing capacitors C1 and C2. For this reason, the voltage waveforms across the voltage-dividing capacitors C1 and C2 become waveforms such as those shown in FIG. 5. Note that voltages VC1 and VC2 are superposed and shown with the alternating current zero as a boundary.

Note that it is desirable that the ratio of the capacitance value of the smoothing capacitor Cs and the capacitance value of the voltage-dividing capacitor C1 or C2 be about 1:$\frac{1}{10000}$. When, for example, the capacitance value of the smoothing capacitor Cs is 7~10~100 $\mu$F, the capacitance value of the voltage-dividing capacitor C1 or C2 is 0.004~0.01 $\mu$F. This is considered to be for the following reasons. If the capacitance of the voltage-dividing capacitor C1 or C2 increases, the quiescent time period of an input current will occur near the alternating current zero of an input voltage, and the input current will become a current with a low power factor (so-called capacitor-input current waveform). If, on the other hand, the capacitance of the voltage-dividing capacitor C1 or C1 is low, a high voltage will be obtained across the smoothing capacitor Cs, but the smoothing capacitor Cs will become unstable. Considering this point as well, the above-mentioned ratio is appropriate.

Thus, according to the neutral point inverter with the aforementioned constitution, even in the case where the input voltage Vi has an effective value of 100 V (about 140 V for Vm), an output voltage of approximately 270~300 V is obtained across both ends of the inductor Lo. That is, as in the above-mentioned description, high-frequency alternating current alternately flows in the inductor Lo, whereby high-frequency voltage is generated across the inductor Lo. With the resonance capacitor C4 connected in parallel with the fluorescent lamp LT, this voltage resonates, and along with the pre-heat of the filament of the fluorescent lamp, this resonance voltage (high voltage) lights the fluorescent lamp LT. After the fluorescent lamp LT has been lit, the choke coil function of the inductor La controls the current through the fluorescent lamp LT to a constant current and stably lights the fluorescent lamp LT. Note that, depending on the types of fluorescent lamps, lighting can be started in a cold-cathode state. Therefore, in this case there is no need to use the resonance capacitor C4.

Also, for the high-frequency current of the commercial power supply, the neutral point inverter according to the present invention is almost the same as the conventional neutral point inverter and can reduce the high frequency current by inserting the low-pass filter LPF in the input thereof. Therefore, the neutral point inverter according to the present invention can sufficiently cope with the high-frequency current problem of the commercial power supply. Rather, the neutral point inverter according to the present invention becomes better because no peak current flows. In addition, since no peak current flows, there is a degree of freedom in the selection of the smoothing capacitor Cs, and a variety of constants can be selected, including ripple voltage and the like as well.

Note that the neutral point inverter according to the present invention has not adopted a perfect smoothing method. Therefore, it can obtain desired characteristics by the smoothing capacitor Cs with a small capacitance, and it is a matter of course that a capacitor with a large capacitance is able to reduce ripple voltage. Other methods such as the aforementioned methods usually require a few 100 $\mu$F as the smoothing capacitor Cs, whereas the neutral point inverter according to the present invention can obtain desired characteristics with the smoothing capacitor Cs of 7~10 $\mu$F. Therefore, the neutral point inverter according to the present invention is suitable for a reduction in the device size which can use a small-size capacitor as the smoothing capacitor Cs.

Figure 7:
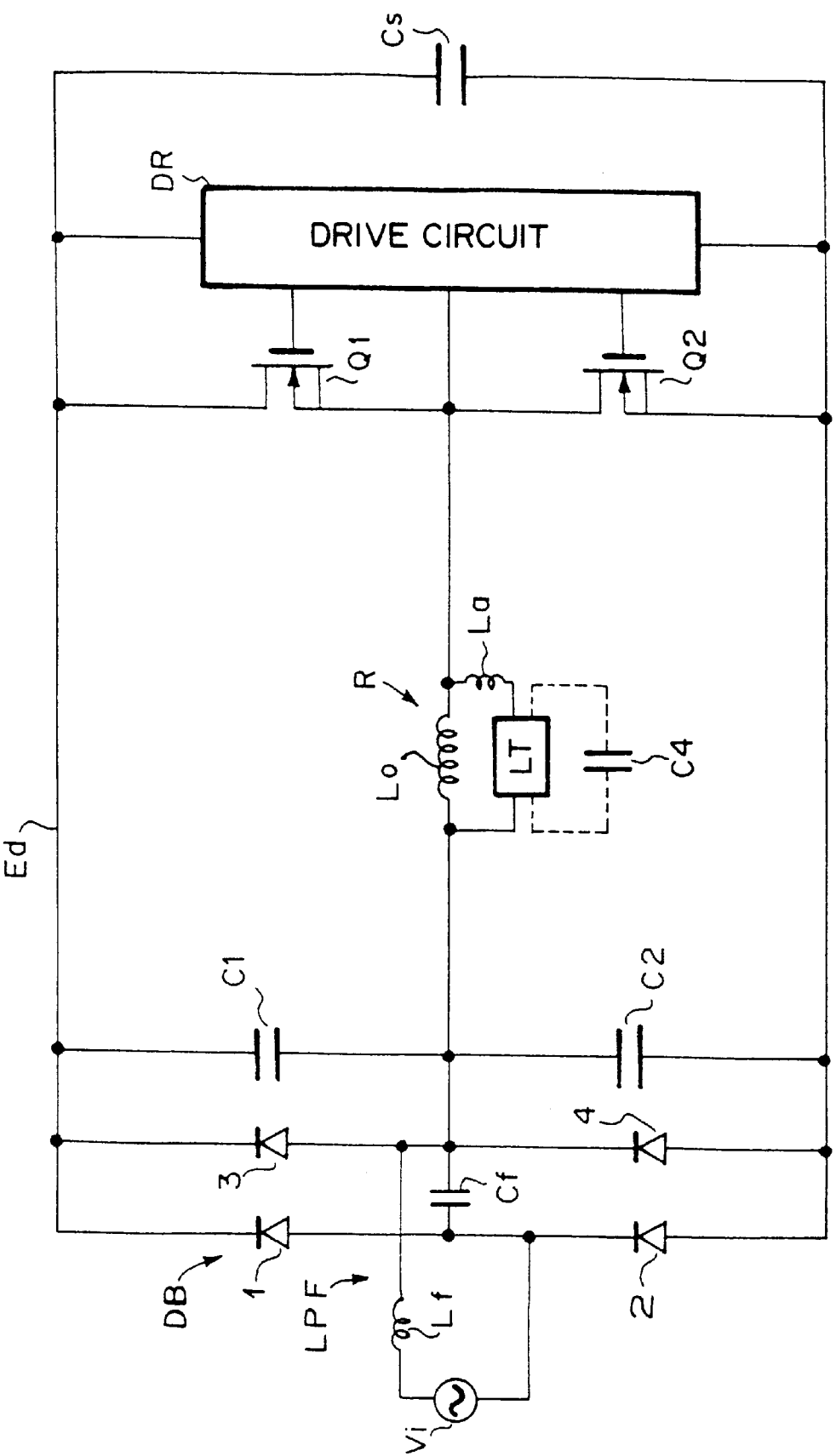
FIG. 7 is a circuit diagram showing the neutral point inverter according to the first embodiment of the present invention in which the switching elements are replaced with FETs.

Note that although the neutral point inverter with the above-mentioned constitution employs transistors as switching elements, the present invention is not limited to these, but any means may be employed if it can be turned on and off. For instance, FETs may be employed as shown in FIG. 7, and other IGBTs, etc., may be used. If these elements are employed, the diodes incorporated in these elements can be employed and therefore the diodes D1 and D2 connected in reverse parallel to the switching elements can be omitted, whereby the circuitry can be further simplified.

Next, a second embodiment of the present invention will be described in detail in reference to FIG. 8. Note that in FIG. 8, the same reference numerals will be applied to the same elements as those in FIG. 1 so a description thereof will be omitted.

In the neutral point inverter according to this second embodiment, the primary winding of a transformer T1 is connected between the neutral point and the SW point, and the fluorescent lamp LT is connected in parallel to the secondary winding of the transformer T1. Furthermore, the fluorescent lamp LT and the resonance capacitor C4 are connected in parallel. The secondary winding of the transformer T1 and the resonance capacitor C4 constitute a parallel resonance circuit, and the resonance voltage that is generated across both ends of the resonance capacitor C4 is applied across the fluorescent lamp LT. As a result, the fluorescent lamp LT lights stably.

Replacing the primary winding of the transformer T1 with an inductor Le becomes equivalent to connecting the inductor Le between the neutral point and the SW point. Therefore, it is found that the circuit according to the second embodiment operates in a similar manner as the circuit according to the aforementioned first embodiment. In addition, the electric power supplied across the primary winding of the transformer (primary inductor) can be effectively transmitted to the secondary side.

In this circuit, high-frequency voltage is supplied across the fluorescent lamp LT by the secondary winding of the transformer T1. Therefore, a desired high-frequency voltage is freely obtainable according to the kinds of fluorescent lamps, without depending on the design of the primary side. That is, if high-frequency alternating current alternately flows in the primary side of the transformer T1, high-frequency voltage corresponding to the winding ratio will be generated on the secondary side of the transformer T1. With the resonance capacitor C4 connected in parallel with the fluorescent lamp, the secondary-side voltage resonates, and along with the pre-heat of the filament of the fluorescent, this resonance voltage (high voltage) lights the fluorescent lamp. The transformer T1 is a leakage type one, which controls the fluorescent lamp current to a constant current and stably lights the lamp. Furthermore, since electric power is supplied across the fluorescent lamp through the transformer, this circuit is insulated from the primary side of the commercial power supply and is also superior in stability. As in the above-mentioned fluorescent lamp LT, in the case where the resistance value relative to applied voltage uses a load showing a negative characteristic, a leakage type transformer is used as the transformer T1 in the same way as the aforementioned. In the case using a load that shows a positive characteristic, an ordinary transformer is used (the same shall apply hereinafter).

Figure 9:
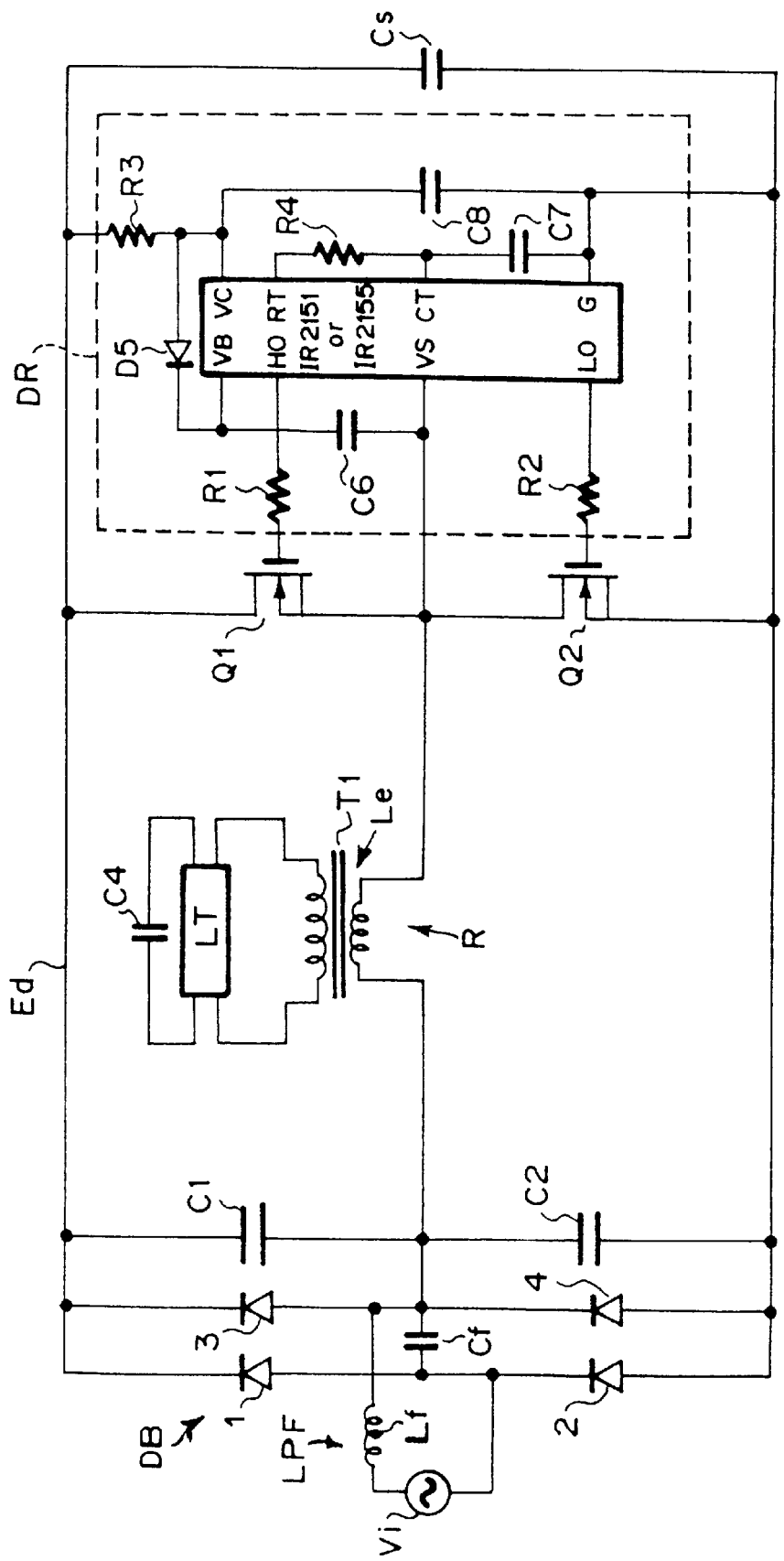
FIG. 9 is a circuit diagram of the drive circuit of the neutral point inverter according to the above-mentioned second embodiment, formed into an integrated circuit (IC) (first example)
Figure 10:
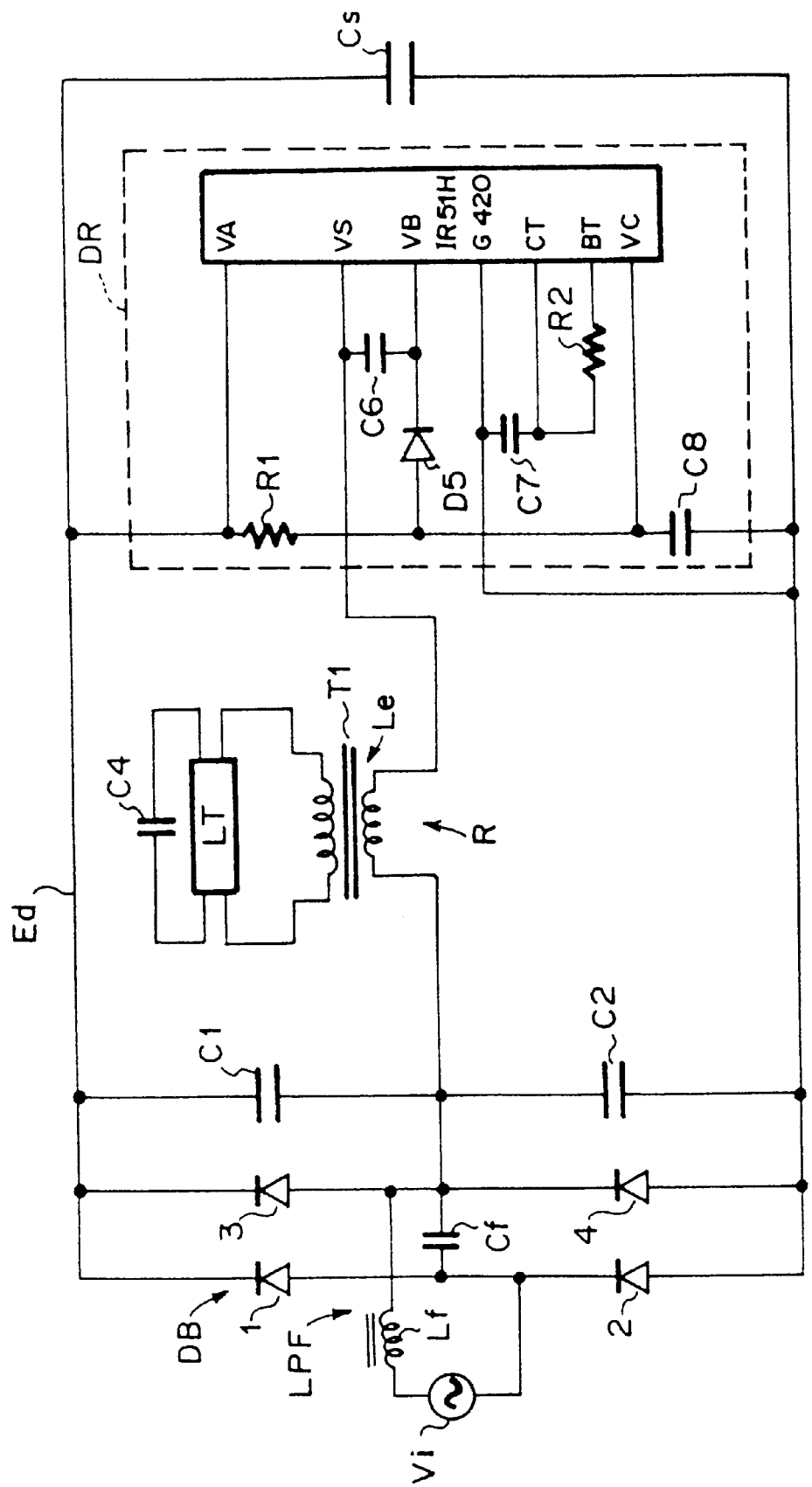
FIG. 10 is a circuit diagram of the drive circuit of the neutral point inverter according to the above-mentioned second embodiment, formed into an IC (second example)

FIGS. 9 and 10 are circuit diagrams showing a specific constitution that employs an integrated circuit (IC) in the drive circuit DR of the neutral point inverter according to the second embodiment of the present invention. Note that the IC is an IC for a modified half-bridge circuit used in the conventional inverter.

Initially a description will be given of the constitution of FIG. 9. As the IC, IR2151 or IR2155 produced by International Rectifier Fareast Co, Ltd. is used. Direct-current voltage Ed is supplied to the power terminal VC of this IC through a resistor R3, and the power terminal VC is further connected to a decoupling capacitor C8. A diode D5 is connected between the power terminal VC and a secondary power terminal VB, and a capacitor C6 is connected between the secondary power terminal VB and a common output VS. A resistor R4 and a capacitor C7 for setting a drive frequency are connected between an RT terminal and a CT terminal and between the CT terminal and a ground terminal G, respectively. Drive outputs HO and LO are connected to switching elements (FETs) Q1 and Q2 through resistors R1 and R2. The common output VS is connected to the connecting point (SW point) between the switching elements (FETs) Q1 and Q2.

In the neutral point inverter with the above-mentioned constitution, the timing at which the switching elements Q1 and Q2 are driven is controlled based on an oscillation frequency that is determined by the resistor R4 and capacitor C7 connected to the IC.

Next, a description will be given of the constitution of FIG. 10. In the figure, as the IC, IR51H420 produced by International Rectifier Fareast Co, Ltd. is used. This IC includes switching elements therein. Direct-current voltage Ed is supplied to a power terminal VA and further connected to a power terminal VC through a resistor R1. A decoupling capacitor C8 is connected to the power terminal VC. A diode D5 is connected between the power terminal VC and a secondary power terminal VB, and a capacitor C6 is connected between the secondary power terminal VB and a common output VS. A resistor R2 and a capacitor C7 for setting a drive frequency are connected between a RT terminal and a CT terminal and between the CT terminal CT and a ground terminal G, respectively. The common output VS is connected to the primary winding of the transformer T1.

In the neutral point inverter with the above-mentioned constitution, the timing at which current flowing in the transformer T1 is driven is controlled based on an oscillation frequency that is determined by the resistor R2 and capacitor C7 connected to the IC.

Thus, in the neutral point inverter according to the present invention, it is also possible to constitute the drive circuit DR by the IC provided for the conventional inverter (e.g., IC for the modified half-bridge circuit, etc., as described above). As a result, further circuit simplification becomes possible.

Figure 11:
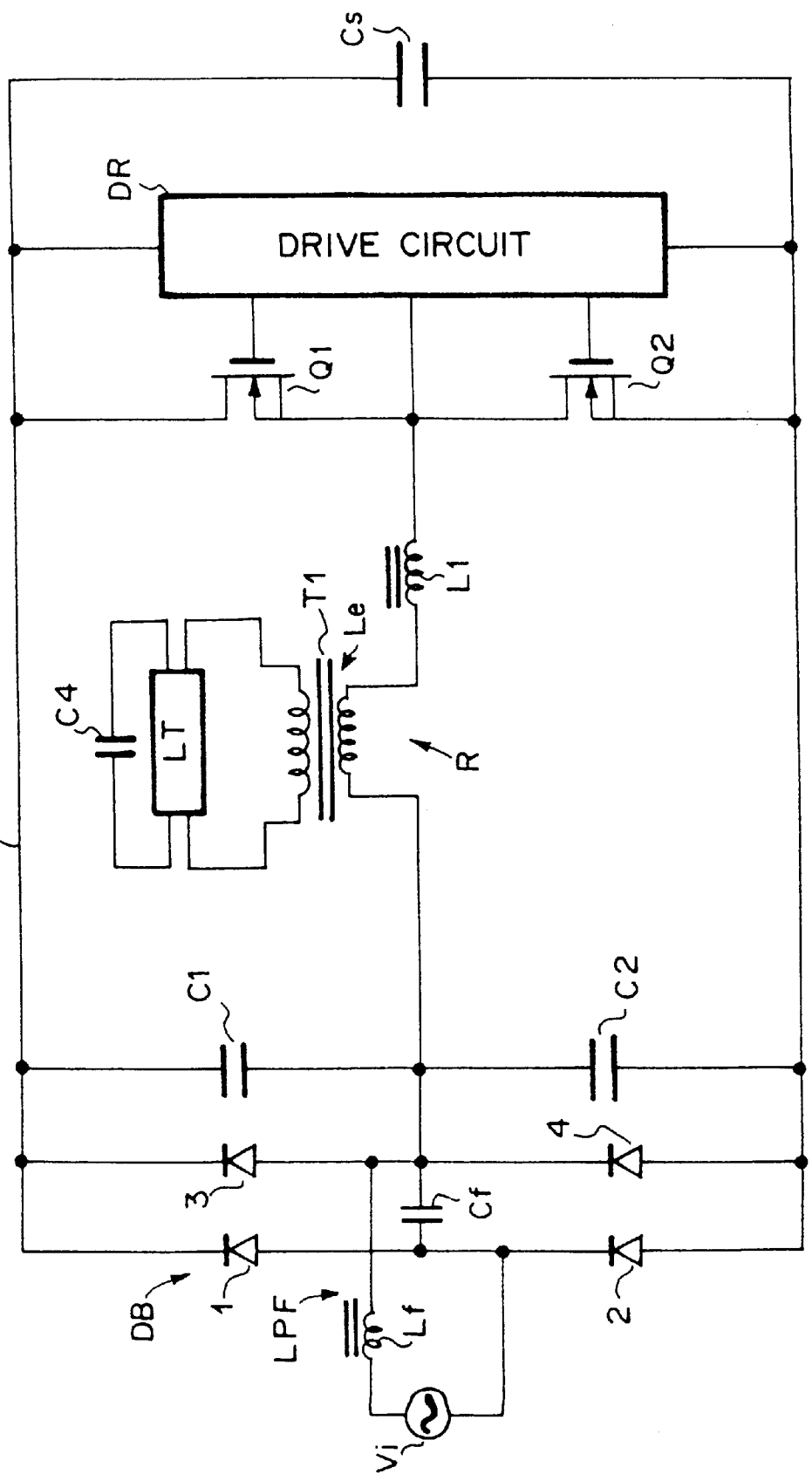
FIG. 11 is a circuit diagram of a neutral point inverter according to a third embodiment of the present invention.

Next, a third embodiment of the present invention will be described in detail with reference to FIG. 11. Note that in FIG. 11, the same reference numerals will be applied to the same elements as those in FIG. 7 and a description thereof will be omitted.

In the neutral point inverter according to this third embodiment, a series circuit consisting of both an inductor L1 and the primary winding of a transformer T1 is connected between the neutral point and the SW point. Replacing the primary winding of the transformer T1 with an inductor Le becomes equivalent to connecting inductors (Le and L1) between the neutral point and the SW point. Therefore, it is found that the circuit according to the third embodiment operates in a similar manner as the circuit according to the aforementioned second embodiment. In this circuit, the inductor L1 is added, so that the voltage that is generated across the primary winding of the transformer T1 decreases by the amount of voltage across the inductor L1. Therefore, the voltage across the primary winding of the transformer T1 can fall to a predetermined voltage in accordance with a load connected to the secondary winding of the transformer T1, without varying the winding ratio of the transformer T1. As a result, this circuit is able to prevent the heat generation of the transformer T1 as well.

Figure 12:
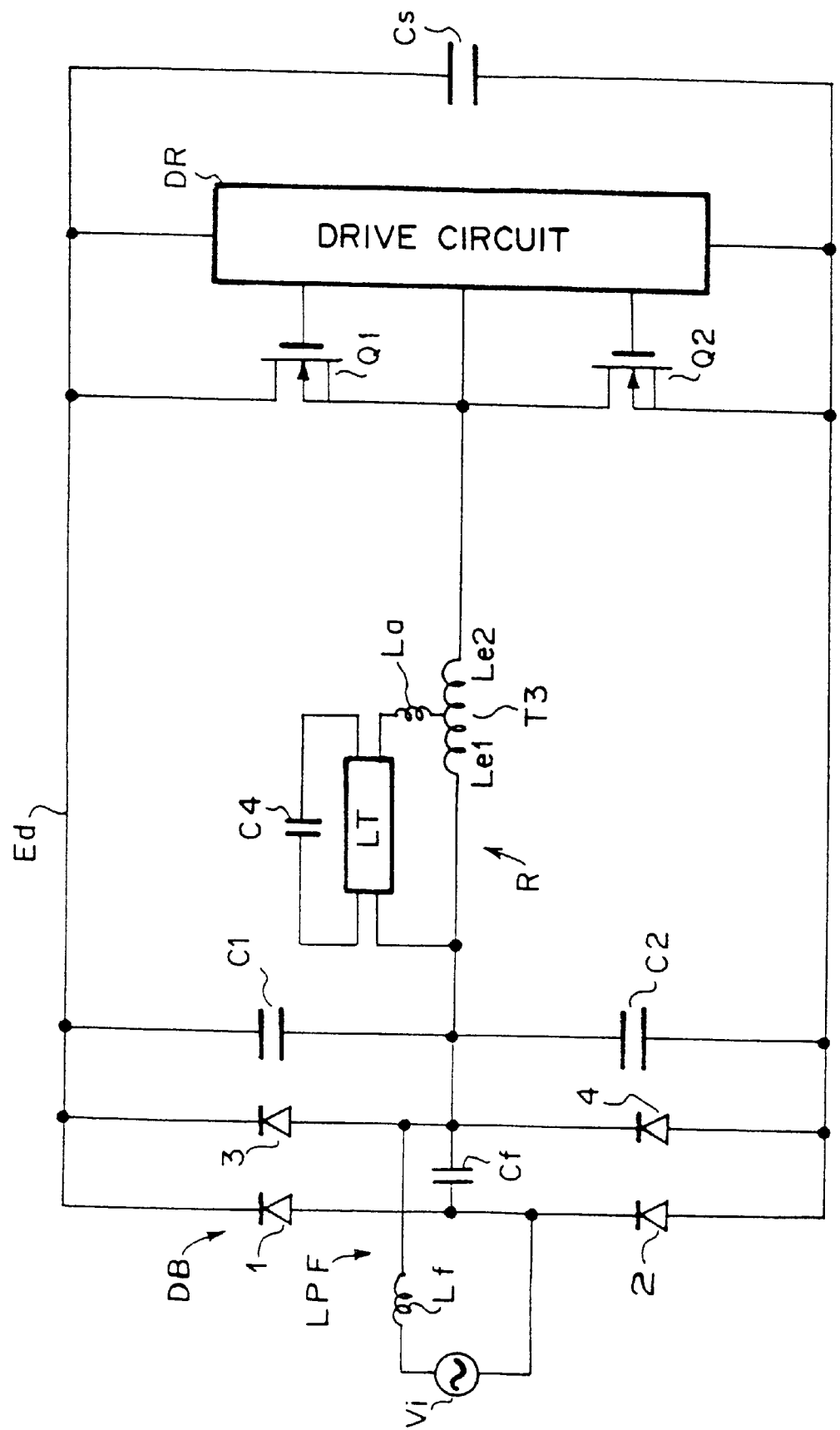
FIG. 12 is a circuit diagram of a neutral point inverter according to a fourth embodiment of the present invention.

Next, a fourth embodiment of the present invention will be described in detail in reference to FIG. 12. Note that in FIG. 12, the same reference numerals will be applied to the same elements as those in FIG. 7 a description thereof will be omitted.

The neutral point inverter according to this fourth embodiment changes the transformer T1 to an autotransformer T3 and also connects a fluorescent lamp LT between one end and a tap output of this autotransformer L3. If the equivalent inductor of the autotransformer L3 is Le1 and Le2 as shown, the circuit operation, as with the above-mentioned third embodiment, is equivalent to connecting the equivalent inductor (Le1 and Le2) between the neutral point and the SW switch. With a resonance capacitor C4 connected in parallel with the fluorescent lamp LT, high-frequency voltage generated across the inductor Le1 resonates, and along with the pre-heat of the filament of the fluorescent lamp LT, this resonance voltage (high voltage) lights the fluorescent lamp LT.

Next, a fifth embodiment of the present invention will be described in detail in reference to FIG. 13. Note that in FIG. 13, the same reference numerals will be applied to the same elements as those in FIG. 9 and a description thereof will be omitted.

Figure 13:
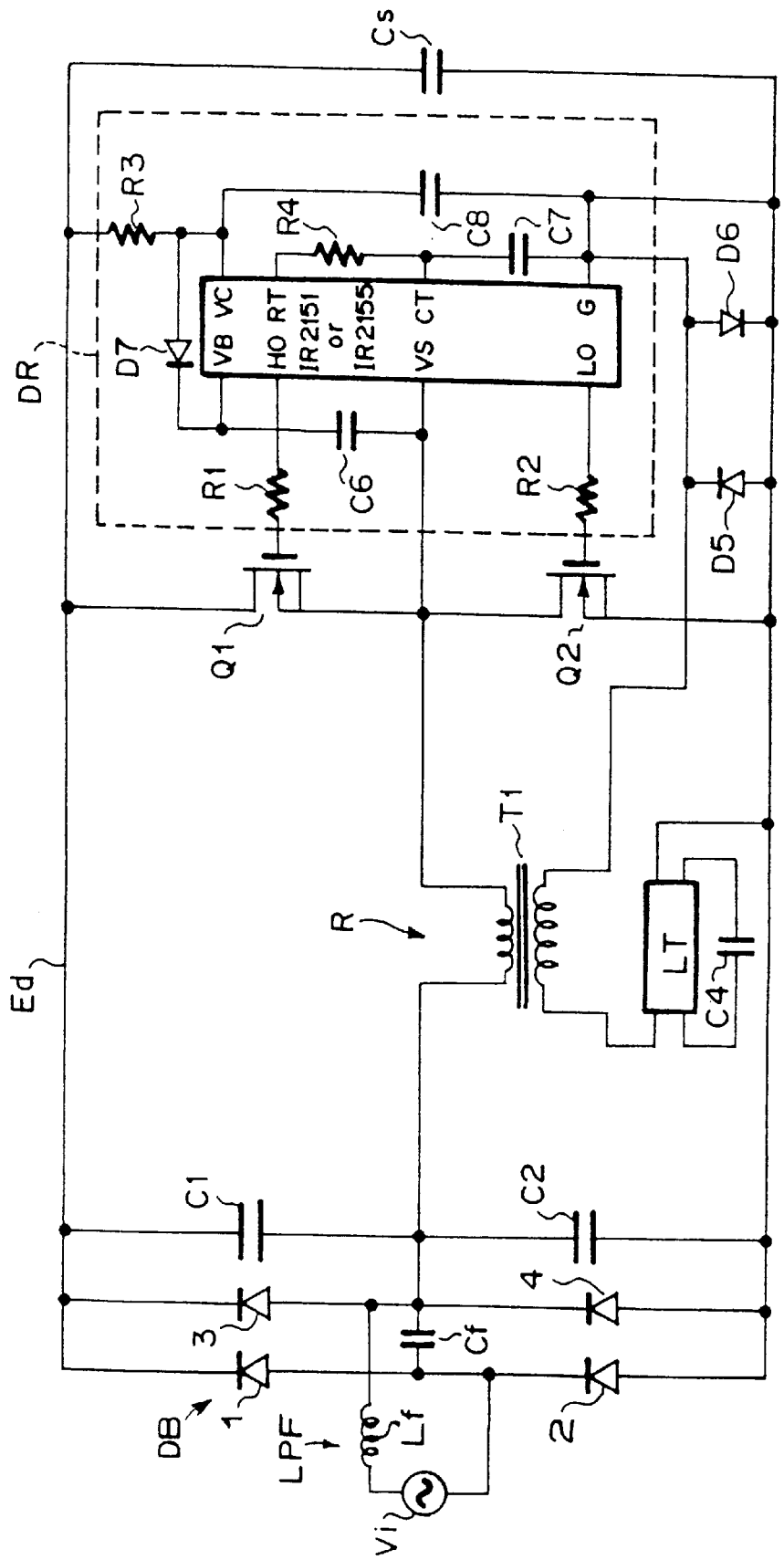
FIG. 13 is a circuit diagram of a neutral point inverter according to a fifth embodiment of the present invention.

In the neutral point inverter according to the second embodiment (FIG. 9) in which the drive circuit DR is formed into an IC (IR2151 or IR2155), whereas the neutral point inverter according to the fifth embodiment shown in FIG. 13 is equipped with a zero-cross detection circuit, which detects the intersection of the alternating current zero of fluorescent-lamp current (alternating current). The oscillation of the drive circuit DR is controlled based on the output of this zero-cross detection circuit. The secondary side of a transformer T1 is connected to a series circuit, which consists of two diodes D5 and D6 connected in opposite directions and a fluorescent lamp LT. The two diodes function as the zero-cross detection circuit. The connecting point between the zero-cross detection circuit and the fluorescent lamp LT is connected to one end of the direct current output of a rectifier DB. The other end of the zero-cross detection circuit is connected to the oscillation capacitor C7 of the drive circuit DR.

The resonance frequency of the resonance circuit, which consists of the second winding of the transformer T1, the fluorescent lamp LT, and the resonance capacitor C4, varies between when the fluorescent lamp LT begins to light and when it continues to belit. However, by detecting the intersection of the alternating current zero of the fluorescent lamp current with the zero-cross detection circuit, the oscillation frequency of the IC is controlled so that high-frequency voltage is applied across the fluorescent lamp LT in an optimal condition.

Figure 14:
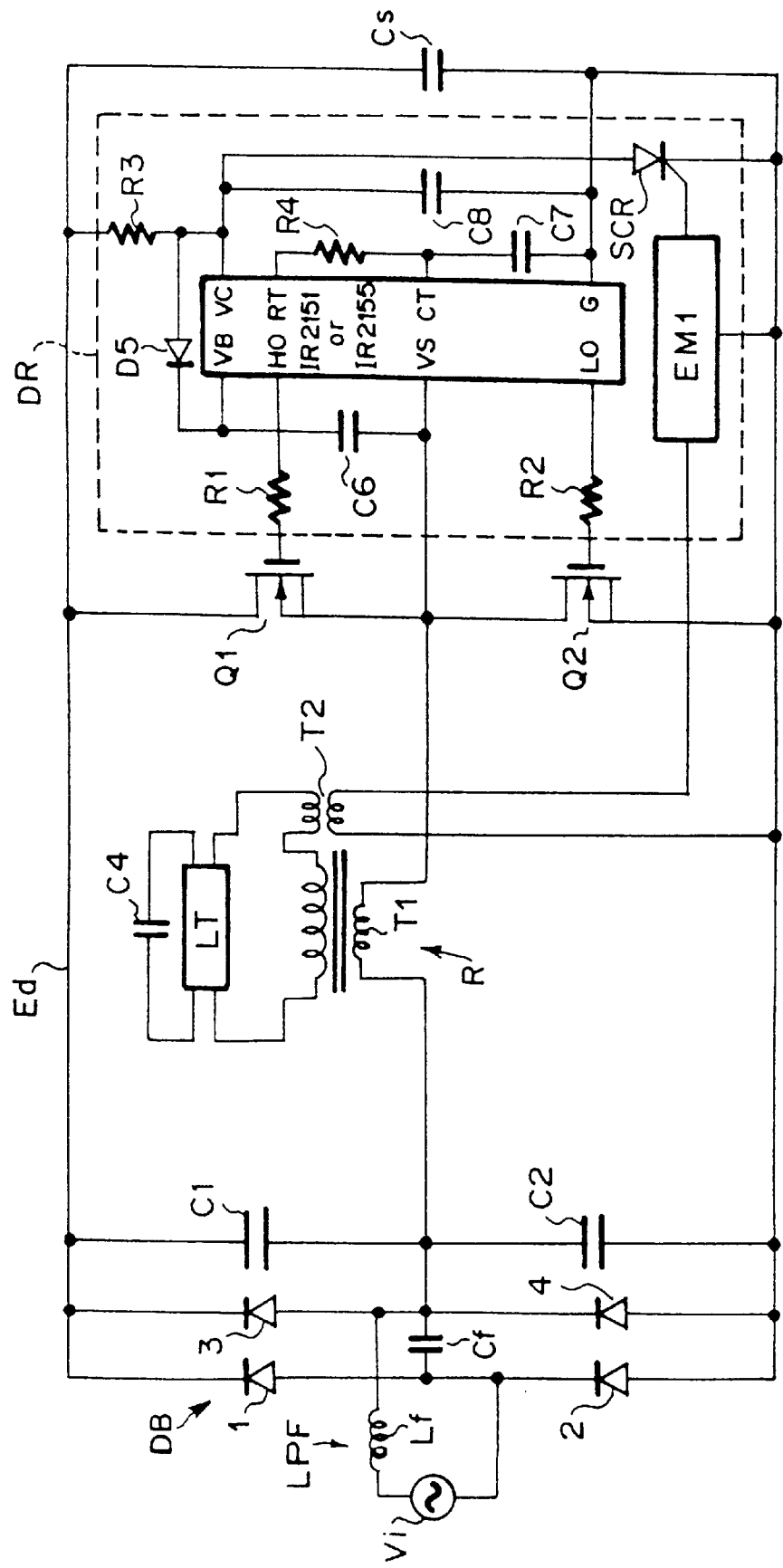
FIG. 14 is a circuit diagram of a neutral point inverter according to a sixth embodiment of the present invention.

Next, a sixth embodiment of the present invention will be described in detail in reference to FIG. 14. Note that in FIG. 14, the same reference numerals will be applied to the same elements as those in FIG. 9 and a description thereof will be omitted.

For the neutral point inverter according to this sixth embodiment, the drive circuit DR includes an abnormal detection circuit EM1 and a thyristor SCR in the neutral point inverter according to the second embodiment (FIG. 9) in which the drive circuit DR is formed into an IC (IR2151 or IR2155). When there is abnormality in a load circuit, this inverter stops the operation of the drive circuit DR and prevents degradation of elements, such as switching elements, load circuits, and the like.

The thyristor SCR is connected between the power terminal VC and ground terminal G of the IC in a forward direction (where the anode is connected to the power terminal VC of the IC). The secondary side of a transformer T1 is equipped with a second transformer T2 in which the primary winding thereof is connected in series to the load (fluorescent lamp LT). One end of the secondary side of this transformer T2 is connected to the ground terminal of the IC, while the other end is connected to the abnormal detection circuit EM1.

The abnormal detection circuit EM1 detects either a voltage that is generated across the secondary side of the transformer T2 or a current that flows in the secondary side of the transformer T2, or both of them, thereby detecting whether or not there is abnormality in the load circuit. When there is an abnormality, the abnormal detection circuit EM1 turns on the thyristor SCR, thereby stopping the operation of the drive circuit DR. More particularly, the abnormal detection circuit EM1 determines an abnormal condition, such as whether an abnormal voltage has been generated across the fluorescent lamp LT, whether an abnormal current flows, furthermore whether the filament has been cut, whether a fluorescent lamp LT with an unsuitable size has been connected, or the like. When this abnormal detection circuit EM1 determines an abnormal condition such as the aforementioned, it turns on the thyristor SCR and stops the supply of voltage to the power terminals VB and VC of the IC. As a result, during an abnormal condition, the drive of the switching elements Q1 and Q2 is stopped and degradation and breakdown of elements, such as switching elements, load circuits, and the like, is prevented.

In addition, in the case where the thyristor SCR is employed, if an abnormal condition is determined and also the supply of voltage to the power terminals VB and VC of the IC is stopped, thereafter the power source (alternating current input) must be turned off once in order to return the drive circuit DR to its normal condition when recovering from the abnormal condition. However, for example, if a transistor is employed, the abnormal detection circuit EM1 can recognize that the drive circuit DR has been recovered from an abnormal condition and can also return the supply of voltage to the power terminals VB and VC of the IC automatically.

Figure 15:
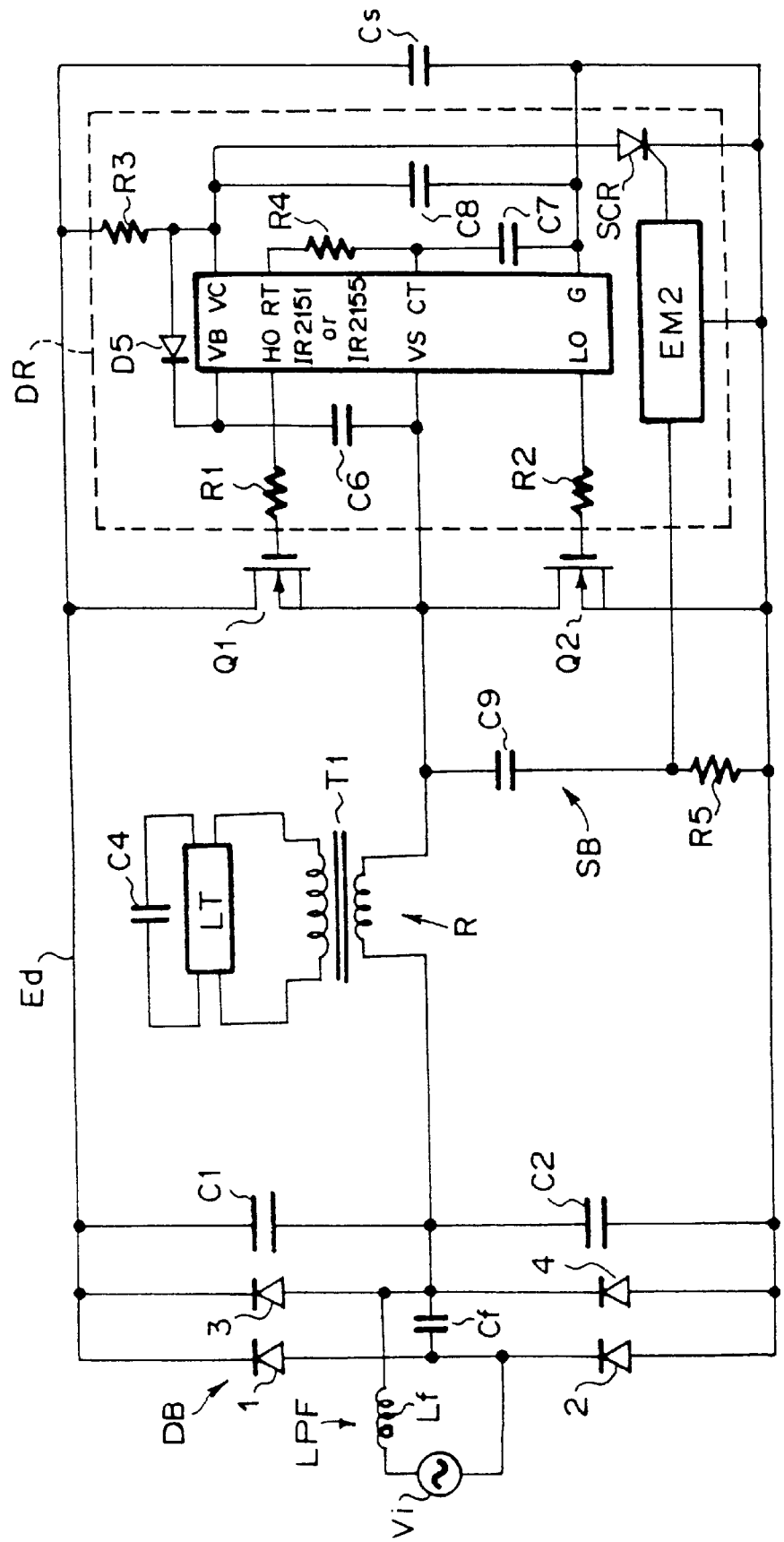
FIG. 15 is a circuit diagram of a neutral point inverter according to a seventh embodiment of the present invention.

Next, a seventh embodiment of the present invention will be described in detail in reference to FIG. 15. Note that in FIG. 15, the same reference numerals will be applied to the same elements as those in FIG. 9 and a description thereof will be omitted.

For the neutral point inverter according to this seventh embodiment, as with the sixth embodiment, the drive circuit DR includes an abnormal detection circuit EM2 and a thyristor SCR in the neutral point inverter according to the second embodiment (FIG. 9) in which the drive circuit DR is formed into an IC (IR2151 or IR2155). When there is abnormality in a load circuit, this inverter stops the operation of the drive circuit DR, thereby preventing degradation of elements, such as switching elements, load circuits, and the like. In the sixth embodiment, although an abnormal condition is detected by the transformer T2, this embodiment differs in that an abnormal condition is detected by voltage that is generated in a snubber circuit SB consisting of a resistor R5 and a capacitor C9.

The thyristor SCR is connected between the power terminal VC and ground terminal G of the IC in a forward direction. A snubber circuit SB, which consists of the resistor R5 and the capacitor C9, is connected in parallel with a switching element Q2, and voltage that is generated across this resistor R5 is supplied to the abnormal detection circuit EM2. The snubber circuit SB absorbs an abnormal voltage that is generated at a common output VS, thereby preventing switching elements Q1 and Q2 from being broken down by overvoltage.

The abnormal detection circuit EM2 determines whether or not voltage that is generated on the common output VS is within a predetermined range. If the voltage is not within the predetermined range, the detection circuit EM2 turns on the thyristor SCR and stops operation of the drive circuit DR. More specifically, during an abnormal condition, such as filament disconnection or when a fluorescent lamp with an unsuitable size is connected, an abnormal voltage is generated at the common output VS. At the same time, voltage corresponding to this abnormal condition is also generated across the resistor R5 of the snubber circuit SB. Therefore, the abnormal detection circuit EM2 detects this voltage, turns on the thyristor SCR, and then stops the supply of voltage to the power terminals VB and VC of the IC. As a result, during an abnormal condition, the drive of the switching elements Q1 and Q2 is stopped and degradation and breakdown of elements, such as switching elements, load circuits, and the like, is prevented. As with the above-mentioned sixth embodiment, it is possible to change the thyristor SCR to a transistor.

Figure 16:
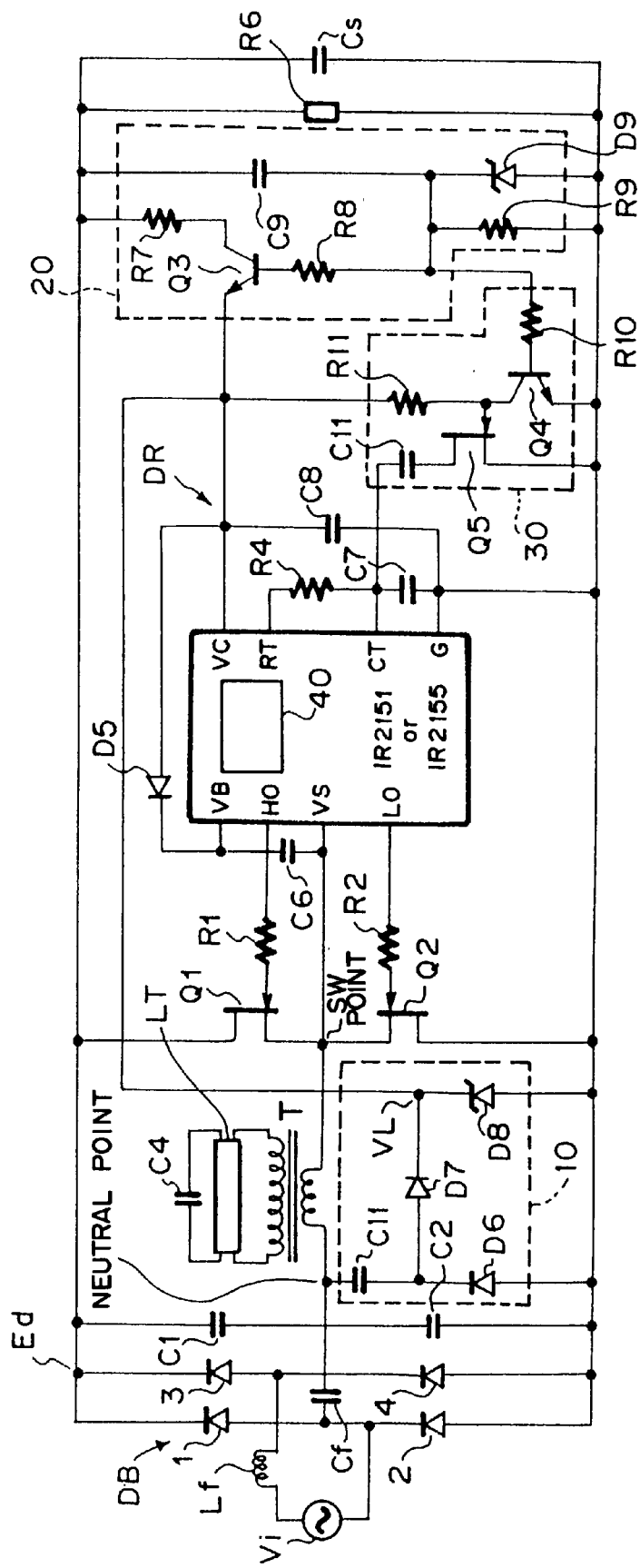
FIG. 16 is a circuit diagram of a neutral point inverter according to an eighth embodiment of the present invention.

Next, an eighth embodiment of the present invention will be described in detail in reference to FIG. 16. Note that in FIG. 16, the same reference numerals will be applied to the same elements as those in FIG. 9 and a description thereof will be omitted.

In the neutral point inverter according to this eighth embodiment, a DC voltage generating circuit 10, a start circuit 20, and a frequency change circuit 30 are further added to the circuit constitution of the second embodiment, which uses an IC (IR2151 or IR2155), as a basic constitution. Note that a resistor R6, connected in parallel with a smoothing capacitor Cs, is a discharge resistance for discharging the accumulated electric charge of the smoothing capacitor Cs.

The DC voltage generating circuit 10 consists of a capacitor C11 and diodes D6, D7, and D8. The capacitor C11 is connected to a neutral point, and high-frequency voltage that is generated on the neutral point is rectified. A predetermined direct-current voltage (usually Zener voltage across Zener diode D8) VL (VL<Ed) is generated at the cathode terminal of the diode D7. This direct-current voltage VL is supplied to a drive circuit DR.

The start circuit 20 consists of a timer circuit and a switch circuit. The timer circuit consists of a capacitor C9 and a resistor R9, and the switch circuit consists of a resistor R7, a transistor Q3, and a resistor R8. A Zener diode D9 is connected in parallel to the diode R9. The direct-current voltage VL from the DC voltage generating circuit 10 is applied to the emitter terminal of the transistor Q3. If alternating voltage is applied from an AC power supply Vi to the inverter, direct-current voltage Ed will be generated across a smoothing capacitor Cs. Immediately after the application of voltage, the capacitor C9 has no accumulated electric charge and also the voltage across the capacitor C9 is zero, so that the direct-current voltage is applied to the base terminal of the transistor Q3 through the resistor R8. On the other hand, immediately after application of voltage, voltage cannot be generated in the DC voltage generating circuit 10, so that the emitter terminal of the transistor Q3 is near 0 V. As a result, immediately after application of voltage, the transistor Q3 is turned on and the direct-current voltage Ed is supplied to the drive circuit DR through the resistor R7. For this reason, immediately after voltage application, high-frequency voltage is generated across the primary winding of the transformer T1, because the direct-current voltage Ed operates the drive circuit DR. Note that the resistor R7 will be sufficient if it can operate the drive circuit DR immediately after voltage application and therefore the resistor R7 can have a sufficiently large resistance value.

After a predetermined time period, electric charge is gradually accumulated in the capacitor C9, and the applied voltage to the base terminal of the transistor Q3 decreases. If this applied voltage goes to approximately direct-current voltage VL or less, the transistor Q3 will be turned off and the supply of the direct-current voltage Ed to the drive circuit DR will be stopped. If, on the other hand, the inverter is normal, the direct-current voltage VL obtained by the DC voltage generating circuit 10 has been supplied to the drive circuit DR, as described above. Therefore, even if the transistor Q3 were turned off, the drive circuit DR will continue to operate and high-frequency voltage will be continuously generated across the primary winding of the transformer T1 by the on-off operation of the switching elements Q1 and Q2. Thus, immediately after voltage application, the inverter can be started with the start circuit 20. Also, immediately after a predetermined time period, the direct-current voltage VL, which is obtained by rectifying the high-frequency voltage generated on the neutral point (i.e., primary winding of the transformer T1), can be supplied to the drive circuit DR. For this reason, there is no need to supply direct-current voltage to the drive circuit DR through a drop resistor from a high direct-current voltage (e.g., Ed in this embodiment). Consequently, the thermal reliability of the inverter can be enhanced because there is no power dissipation in the drop resistor.

Next, a description will be given with reference to the case where there is an abnormality in the inverter, such as when the fluorescent lamp LT is not set in the inverter or when the fluorescent lamp LT is leaking. Even when there is an abnormality in the inverter, the drive circuit DR operates so as to try to light the fluorescent lamp normally. For this reason, high-frequency voltage greater than when the inverter is normal is generated at the SW point and high-frequency voltage less than when the inverter is normal is generated at the neutral point. Therefore, when there is an abnormality in the inverter, the direct-current voltage VL, obtained by rectification in the DC voltage generating circuit 10, falls compared with when the inverter is normal (this voltage is referred to as abnormal-time voltage VF). The interior of the IC constituting the drive circuit DR is equipped with a drive stop circuit 40. The drive stop circuit 40 stops the operation of the IC when applied voltage on the power terminal VC is equal to or less than a predetermined voltage value. That is, the drive stop circuit 40 stops the on-off operation of the switching elements Q1 and Q2 when the direct-current voltage VL that is obtained by rectification in the DC voltage generating circuit 10 is equal to or less than a predetermined voltage value. For this reason, if the abnormal-time voltage VF goes to less than a voltage value at which the IC operation stops, the on-off operation of the switching elements Q1 and Q2 will be stopped. As a result, high-frequency voltage will not be generated at either the SW point or the neutral point. As a result, the direct-current voltage in the DC voltage generating circuit 10 also goes to near zero.

Thus, once the on-off operation of the switching elements Q1 and Q2 is stopped, there is no possibility that the on-off operation of the switching elements Q1 and Q2 will recover unless the inverter turn off an AC input and has it restarted. Thus, if abnormality occurs in the inverter, monitoring a reduction in the direct-current voltage VL can automatically stop the inverter. For this reason, the inverter can avoid the danger that the high-frequency voltage at the SW point greater than when the inverter is in a normal condition will break down the switching elements Q1 and Q2 or other elements during abnormality. The inverter does not only enhance the aforementioned thermal reliability but is also has protected during abnormality. In these respects, the reliability of the inverter is considerably enhanced.

Note that although the above-mentioned description has been given of the drive stop circuit 40 provided in the interior of the IC, means constituting the drive stop circuit 40 is not important. Any means may be used as long as it stops the on-off operation of the switching elements Q1 and Q2 when the direct-current voltage VL that is obtained by rectification in the DC voltage generating circuit 10 is outside a predetermined voltage range. A circuit for achieving the aforementioned function may be constructed outside the IC. Furthermore, while the above-mentioned description has been given of the capacitor C11 connected to the neutral point, the present invention is not necessarily limited to this example. For example, the capacitor C11 may be connected to the SW point. In this case, if an abnormality occurs in the inverter, the direct-current voltage VL will rise compared with when the inverter is normal. For this reason, the drive circuit 40 needs to stop the on-off operation of the switching elements Q1 and Q2 when the direct-current voltage VL is equal to or greater than a predetermined voltage.

Note that while it has been described that the direct-current voltage Ed is supplied across the resistor R7 and capacitor C9 of the start circuit 20, the present invention is not always limited to this. Any supply method may be used as long as a predetermined voltage is supplied across the resistor R7 and the capacitor C9 when an alternating current input is turned on. For example, it is possible to supply direct-current voltage from the neutral point. Even if done in this manner, the same operation as the above-mentioned description can be performed.

The neutral point inverter according to the eighth embodiment of the present invention is also equipped with a frequency change circuit 30, which consists of resistors R10 and R11, a transistor Q4, a FET Q5, and a capacitor C11.

Immediately after alternating voltage has been applied, the capacitor C9 has no accumulated electric charge, as described above. Therefore, the direct-current voltage Ed is applied to the base terminal of the transistor Q4 through the resistor R3, whereby the transistor Q4 is turned on. For this reason, the collector terminal of the transistor Q4 approaches 0 V and the FET Q5 connected to the collector terminal is turned off. Hence, immediately after alternating voltage has been applied, the drive circuit DR controls the on-off operation of the switching elements Q1 and Q2 by an oscillation frequency that is determined by the resistor R4 and the capacitor C7. If, on the other hand, a predetermined time period has elapsed after application of alternating voltage, electric charge will be gradually accumulated in the capacitor C9. Thereafter, applied voltage to the base terminal of the transistor Q4 goes to 0 V, and the transistor Q4 is turned off. As a result, the collector terminal of the transistor Q4 goes to approximately VL and therefore the FET Q5 connected to the collector terminal is turned on. Hence, if a predetermined time period elapses after application of alternating voltage, the drive circuit DR controls the on-off operation of the switching elements Q1 and Q2 by an oscillation frequency that is determined by the resistor R4 and the parallel capacitance between the capacitors C7 and C11.

Therefore, the fluorescent lamp LT cannot be lit immediately after voltage application. However, if the constants of the resistor R4 and capacitors C7 and C11 are set so that the filament of the fluorescent lamp LT can be preheated and also the fluorescent lamp LT can be lit after a predetermined time period has elapsed after application of alternating voltage, then preheating of the filament of the fluorescent lamp LT is performed until a predetermined time period elapses after voltage application, and thereafter, the fluorescent lamp LT can be lit. This can lengthen the lifetime of the fluorescent lamp LT. Furthermore, since the predetermined time period can be determined by a timer circuit in the above-mentioned start circuit 20, sharing of the circuit is performed contributing to device miniaturization.

Figure 17:
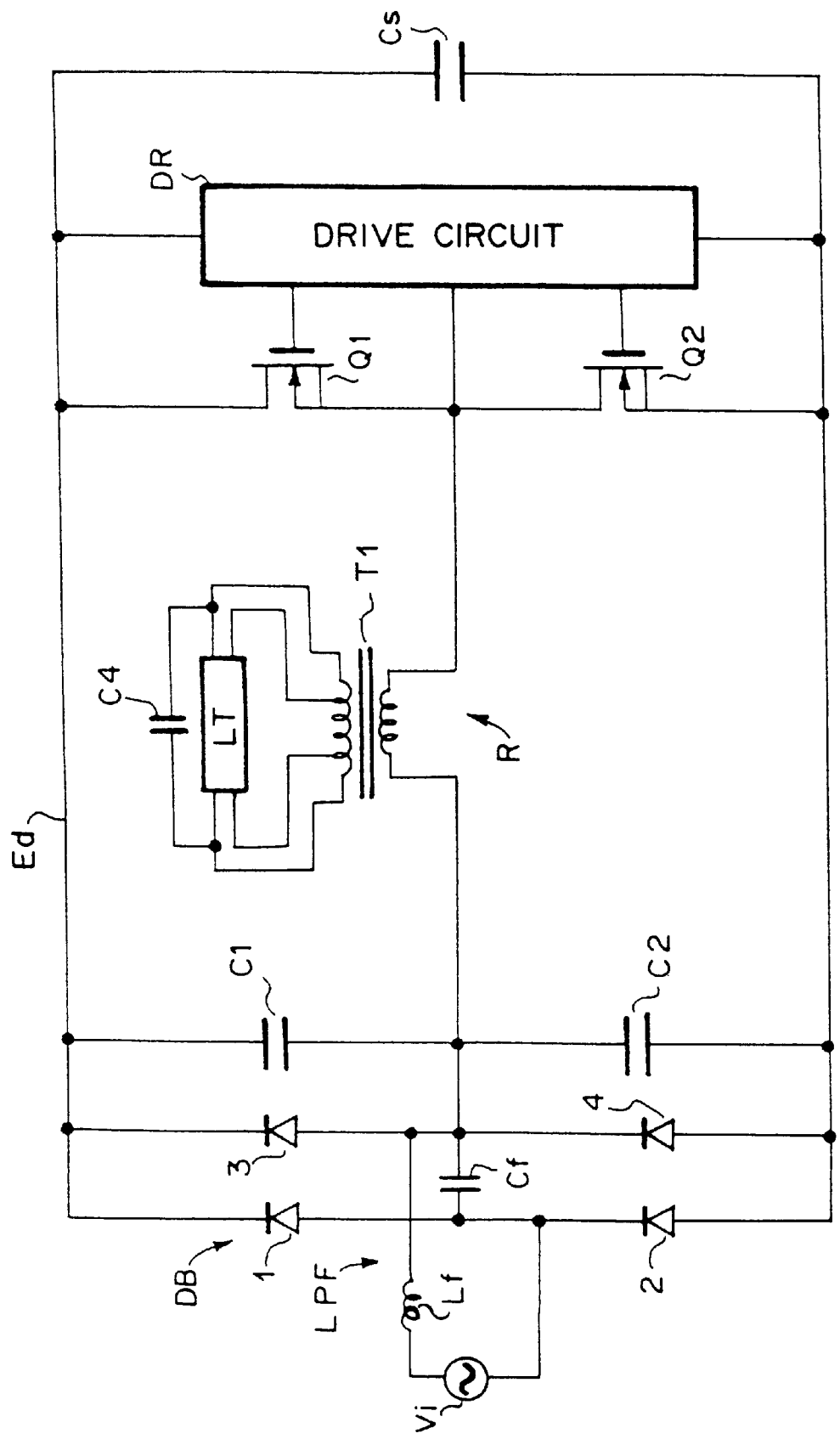
FIG. 17 is a circuit diagram of a neutral point inverter according to a ninth embodiment of the present invention.

Next, a ninth embodiment of the present invention will be described in detail with reference to FIG. 17. Note that in FIG. 17, the same reference numerals will be applied to the same elements as those in FIG. 7 and a description thereof will be omitted.

The neutral point inverter according to this ninth embodiment is constructed so that in the circuit constitution according to the second embodiment, taps are provided on both ends of the secondary winding of a transformer T1 to preheat a fluorescent lamp LT. This inverter renders preheating of the fluorescent lamp LT possible.

Thus, even in the neutral point inverter, the fluorescent lamp LT can be lit after the filament has been preheated. As a result, rapid lighting of the fluorescent lamp can be alleviated.

Note that the method of providing taps for preheating is not limited to this constitution example applied to the circuit constitution according to the second embodiment but is applicable to the circuit constitutions according to the other aforementioned embodiments.

As is evident in the above-mentioned description, according to the neutral point inverter of the present invention in which the inverter is connected between the neutral point and the SW point, voltage applied to a load can be made larger than the conventional neutral point inverter, while the reducing characteristic of harmonic current of a neutral point inverter is being maintained. At the same time, the voltage applied to a load can be made high-frequency voltage in which the difference between the maximum peak Vmax and the minimum peak Vmin is small. A circuit constitution is therefor also structurally simple. Furthermore, since the neutral point inverter is realizable at low cost without particularly requiring any special devices, the practically industrial value is great. Moreover, even if an inductor were replaced with a transformer, the replacement can be readily performed without any change in circuit operation. If an inductor is replaced with a transformer, it will become possible to isolate the primary side from alternating current and load. As a result, the inverter according to the present invention becomes one which is also superior in safety. In addition, by providing taps in the transformer, preheating in the fluorescent lamp can be easily performed. It is also easy to provide a drive stopping means against an abnormal condition, so an inverter can be constructed considering safety design.

Note that the neutral point inverter according to the present invention is not limited to the above-mentioned embodiments. Various modifications and design changes are possible without departing from the scope of the technical concept of the present invention, in which an inductor or an equivalent inductor (e.g., a transformer) is connected between the connecting point of two voltage-dividing capacitors and the connecting point of two switching elements, and in which AC power is also supplied across a load, based on high-frequency voltage generated across the inductor by alternately turning the switching elements on and off.

In addition, while the above-mentioned description has been particularly made with reference to the case where a fluorescent lamp is employed as a load, the present invention is not limited to this but is applicable to various loads, as long as they can be operated with supplied AC power. At this time, a resonance capacitor connected in parallel with a load is not necessary.

Furthermore, although the above-mentioned description has been given of the separately excited drive circuit, the present invention is not always limited to the separately excited drive circuit. The drive circuit may be a self-excited drive circuit that feeds back the self-resonance frequency of a load circuit.

Figure 18:
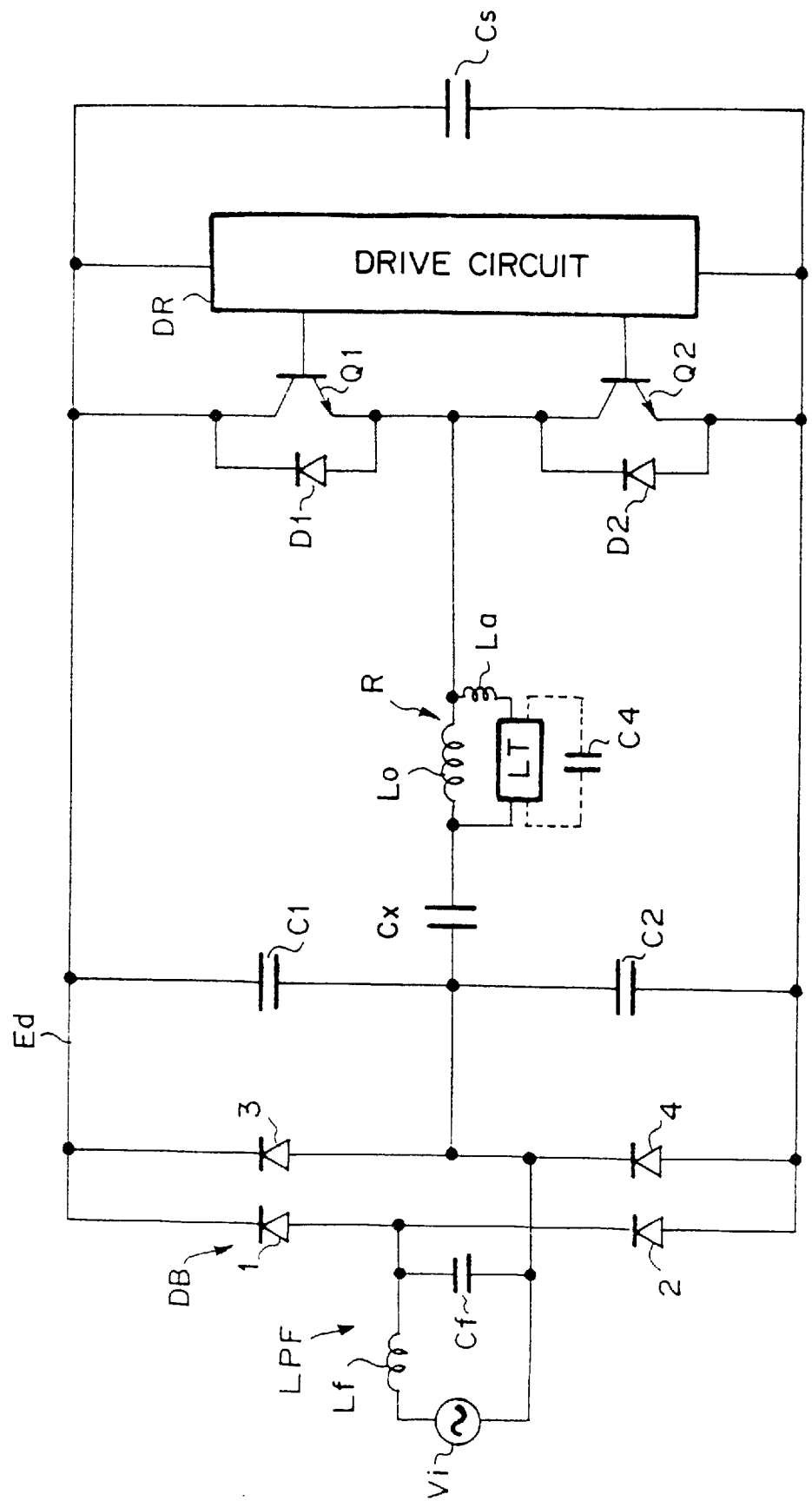
FIG. 18 is a circuit diagram of a neutral point inverter according to a tenth embodiment of the present invention.
Figure 19:
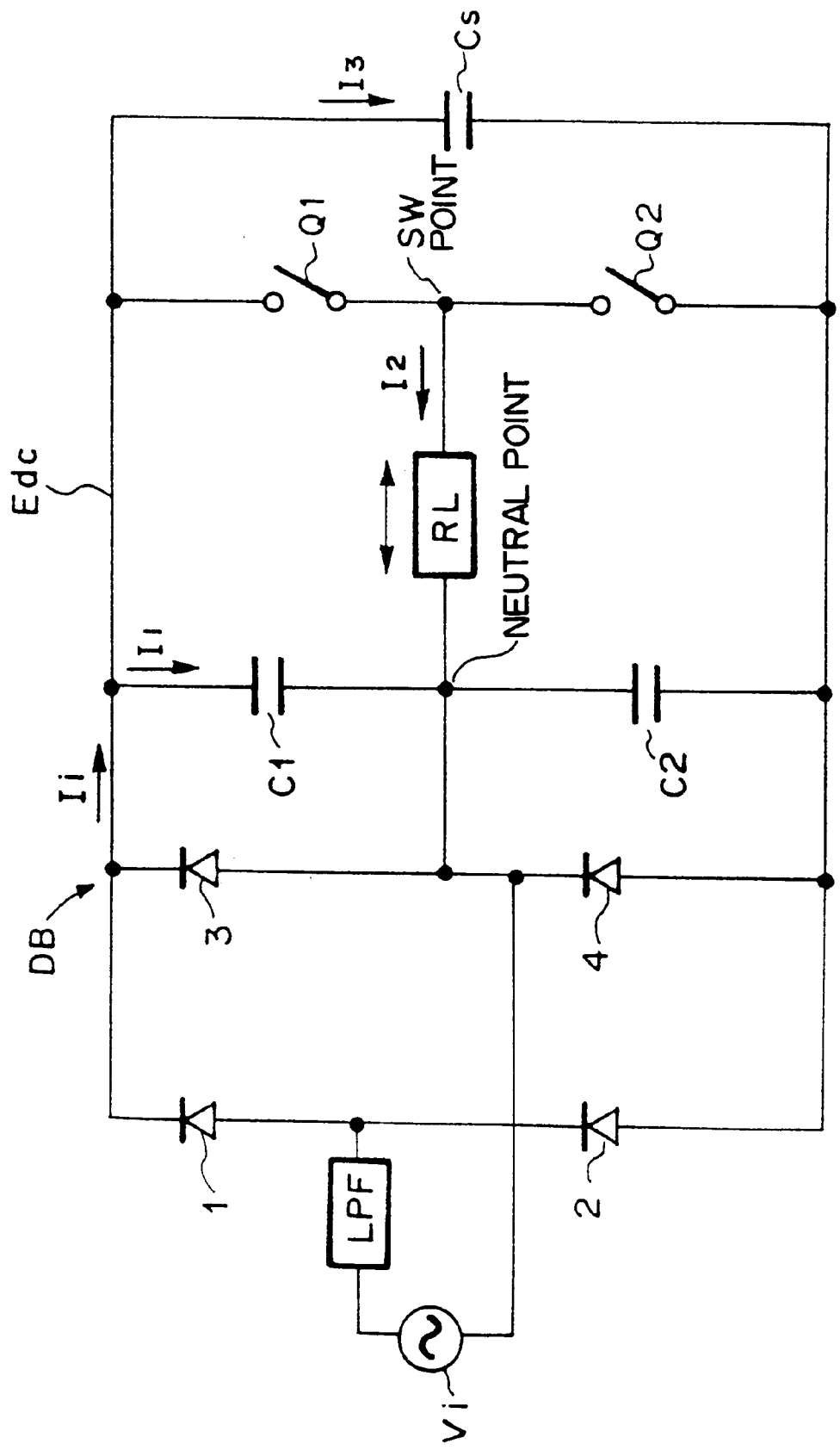
FIG. 19 is a basic circuit diagram of a neutral point inverter.
Figure 20:
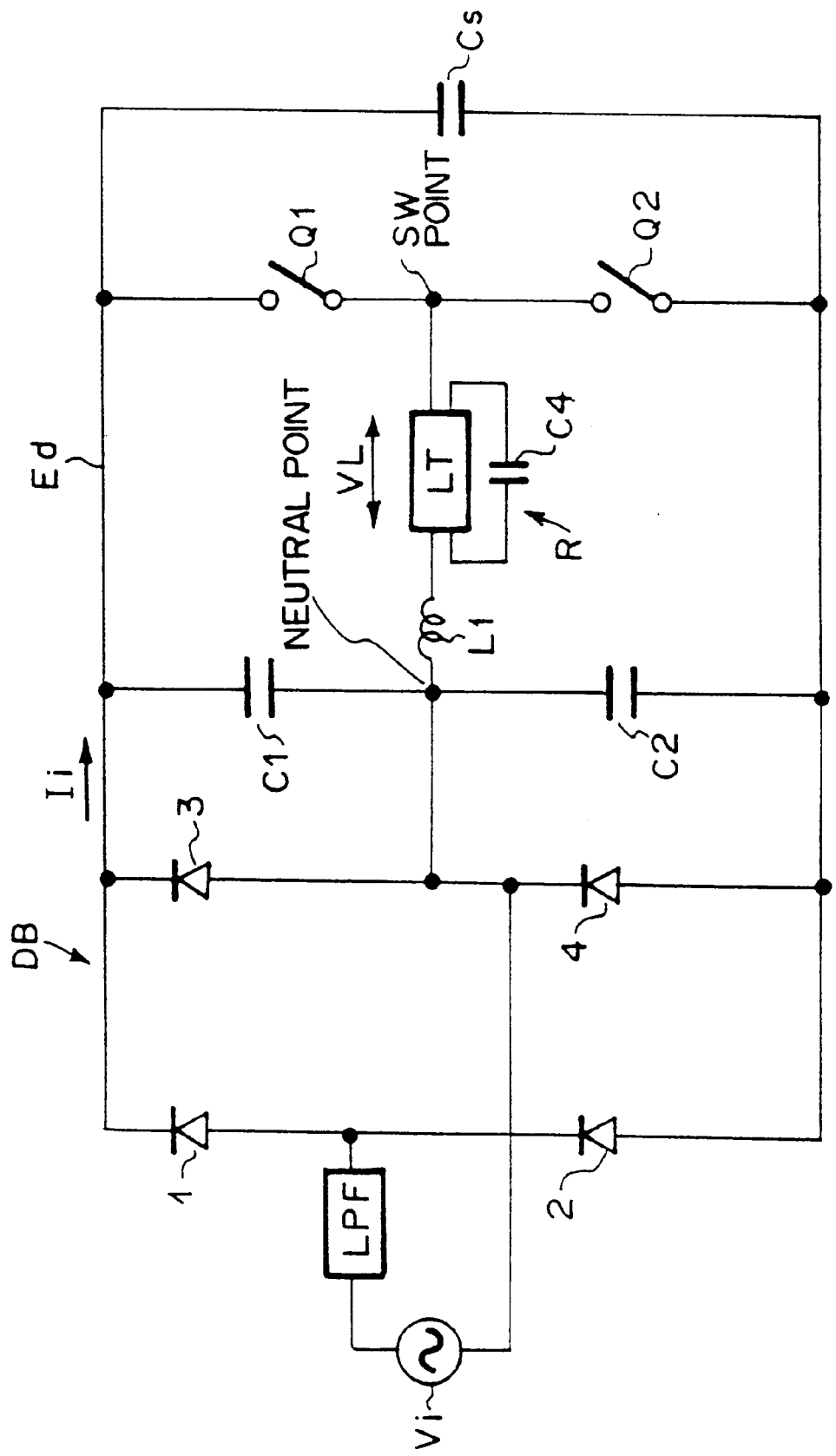
FIG. 20 is an implementation circuit diagram of a neutral point inverter having a fluorescent lamp LT as load.
Figure 21:
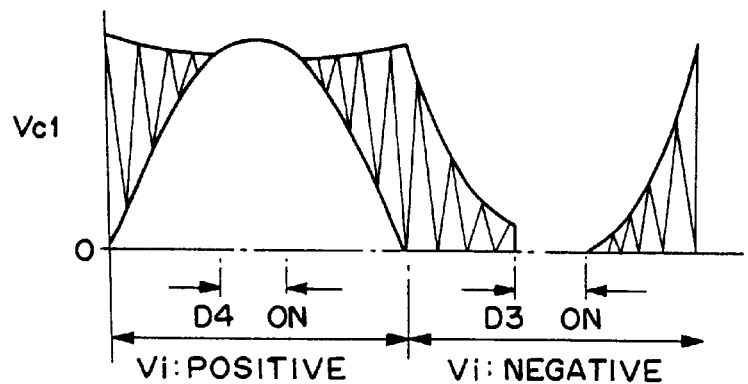
FIG. 21 is a voltage waveform diagram of a first capacitor of the above-mentioned neutral-point inverter type ballast.
Figure 22:
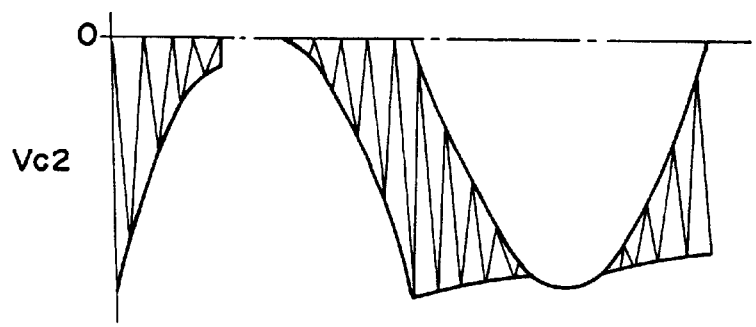
FIG. 22 is a voltage waveform diagram of a second capacitor of the above-mentioned neutral-point inverter type ballast.
Figure 23:
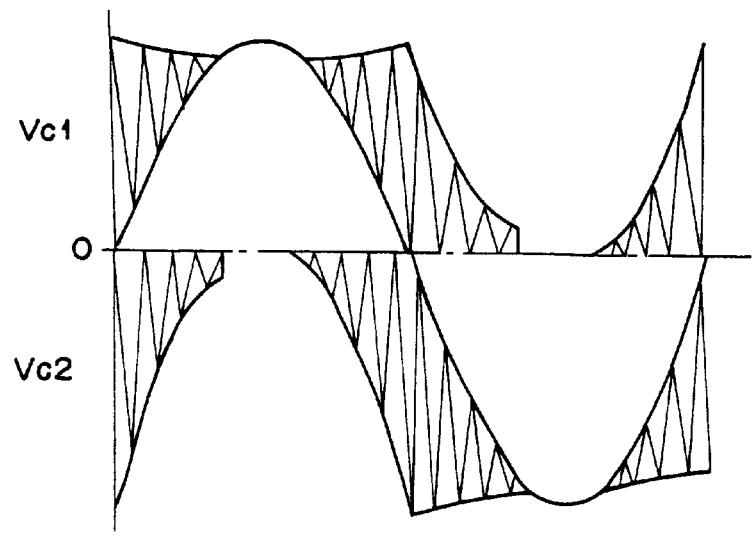
FIG. 23 is a voltage waveform diagram of the load of the above-mentioned neutral-point inverter type ballast.
Figure 25:
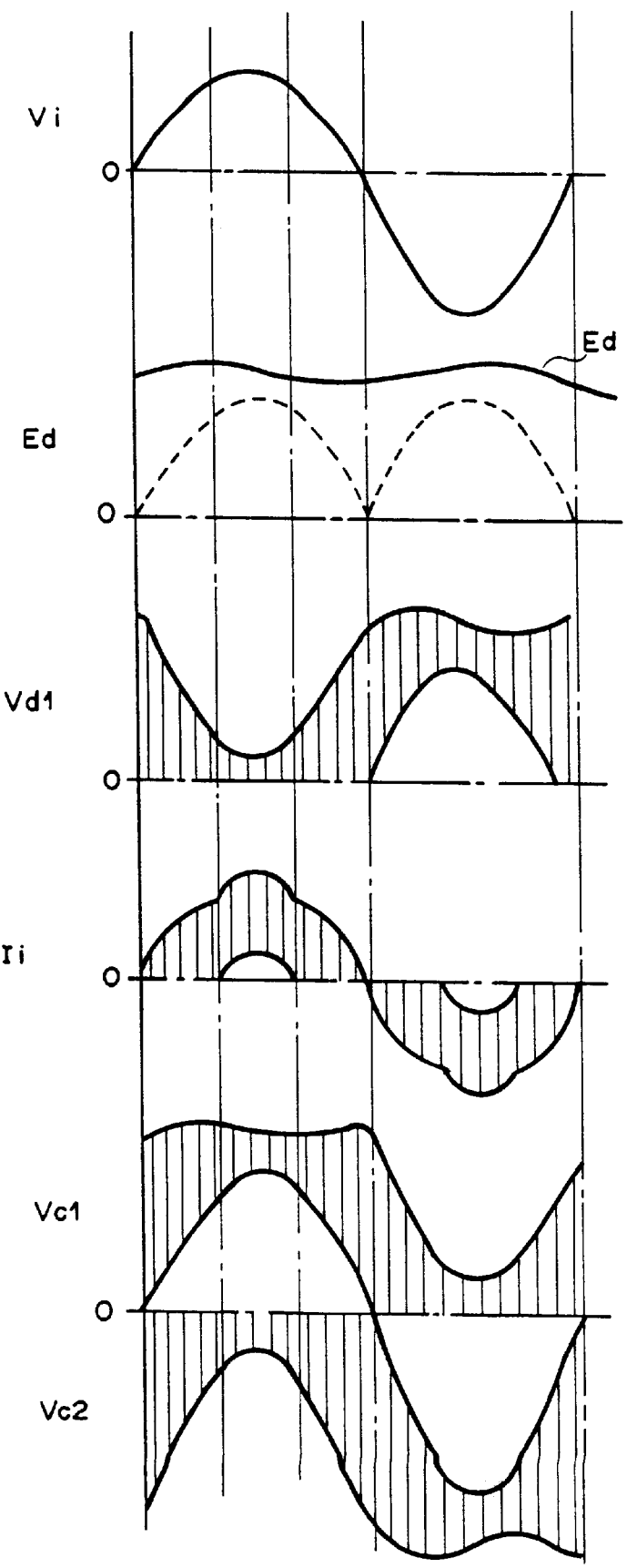
FIGS. 25A, B, C, D, and E are voltage waveform diagrams of the first and second capacitors of the above-mentioned neutral-point inverter type ballast and a current waveform diagram of an input current Ii.
Figure 26:
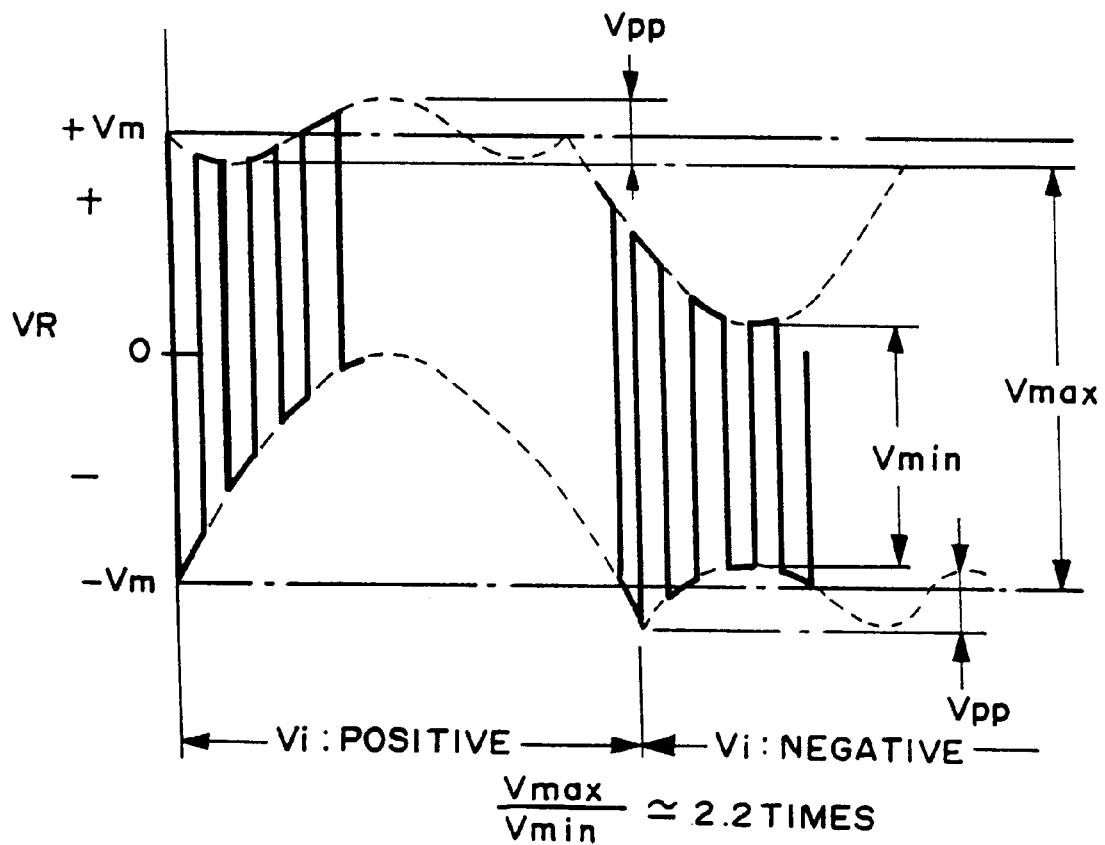
FIG. 26 is a voltage waveform diagram of the load of the above-mentioned neutral-point inverter type ballast.

Next, a tenth embodiment of the present invention will be described in detail in reference to FIG. 18.

In the neutral point inverter according to this tenth embodiment, the inductor Lo of the load circuit in FIG. 1 is replaced with a series circuit, which consists of an inductor Lo and a capacitor Cx. The other points are the same as those shown in FIG. 1.

Thus by connecting the capacitor Cx in series with the inductor Lo, the above-mentioned voltage step-up effect by the inductor Lo or switching elements Q1 and Q2 is reduced, and a voltage approximately equivalent to the peak of an input sine wave can be obtained. Even if the input voltage Vi is doubled, i.e., 2 times Vi, nearly the same output voltage as the case of the input voltage made Vi in FIG. 1 will be obtained across both ends of the inductor Lo.

As a result, for instance, when an input voltage is 100 V, the capacitor Cx is not added as shown in FIG. 1. Also, when an input voltage is 200 V, the capacitor Cx is added as shown in FIG. 18. In this manner, the same output voltage is obtained in both cases. Although a change in the withstand voltage of the capacitor Cf is required, a switch of an input voltage can be readily performed, if only the capacitor Cx is connected or disconnected without changing the constants and the like of other components. This can provide inverters common throughout to the world except for the connection or disconnection of the capacitor Cx and is extremely effective, because the same output voltage is obtained only by using the constitution shown FIG. 1 in countries where an input voltage is between 100 V and 120 V, like Japan and U.S.A., and the constitution shown in FIG. 18 in countries where an input voltage is between 220 V and 240 V, like Europe.

Notice that thus connecting capacitor Cx in series with the inductor Lo is not limited to the constitution shown in FIG. 1 but is likewise applicable to the constitutions according to the other aforementioned embodiments.

Figure 8:
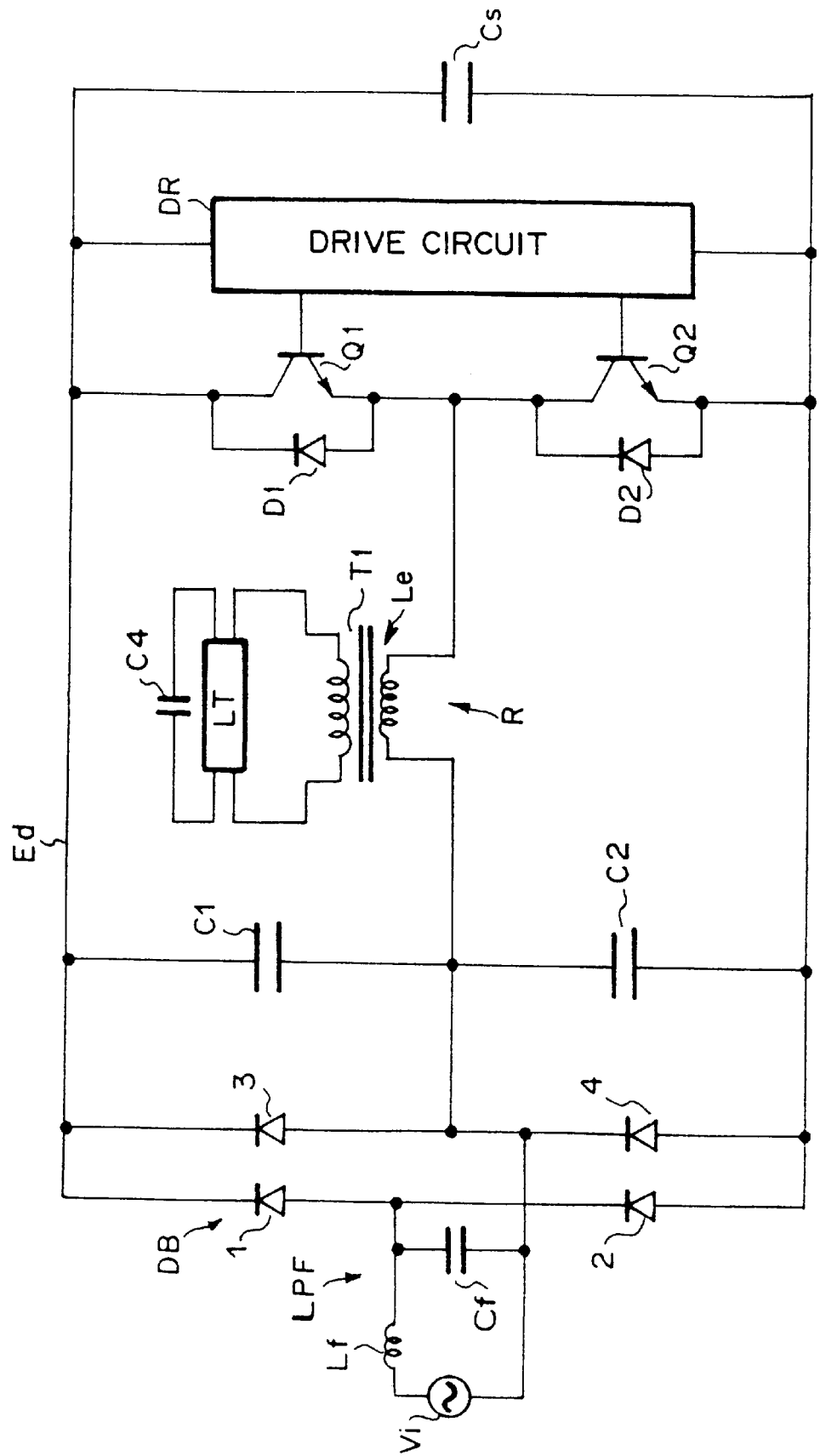
FIG. 8 is a circuit diagram of a neutral point inverter according to a second embodiment of the present invention.

For instance, in FIG. 8, on the side of the connecting point between the capacitors C1 and C2 on the side of the primary winding of the transformer T1, i.e., on the side of the neutral point, the capacitor Cx may be added so that it is connected in series with the aforementioned primary winding (primary inductor). If done in this way, a winding ratio corresponding to high-frequency voltage can be set, while electric power supplied across the primary inductor is effectively being transmitted to the secondary side. In addition, by isolating the secondary winding and the primary side from each other, the inverter can be constructed so that it is also superior in safety. Furthermore, the inverter can easily cope with a switch of an input voltage by connecting or disconnecting the capacitor Cx as described above.

What is claimed is:

1. A neutral point inverter comprising:
   a low-pass filter for passing a basic frequency of alternating current and filtering out a harmonic signal;
   a rectifier for rectifying alternating voltage passed through said low-pass filter;
   a series circuit consisting of first and second capacitors connected to an output of said rectifier;
   a third capacitor for smoothing the output of said rectifier;
   a series circuit consisting of first and second switching elements connected to the output of said rectifier;
   first and second diodes connected in parallel to said first and second switching elements so that direct current through said first diode and direct current through said second diode become opposite in direction;
   a drive circuit for driving said first and second switching elements; and
   a load circuit connected between a connecting point which is between said first and second capacitors and a connecting point which is between said first and second switching elements, said connecting point between said first and second capacitors being connected to an alternating current input of said rectifier, and alternating current power being supplied to said load circuit by alternately turning said first and second switching elements on and off;
   wherein said load circuit includes an inductor and a load connected in parallel with said inductor, said alternating current power being supplied across said load by voltage that is generated across said inductor.

2. The neutral point inverter as set forth in claim 1, wherein said inductor is a primary winding of a transformer and wherein said load is connected to a secondary winding of said transformer.

3. The neutral point inverter as set forth in claim 2, wherein the primary winding of said transformer is connected to one of said connecting points through a second inductor.

4. The neutral point inverter as set forth in claim 2 wherein:
   a zero-cross detection circuit for detecting an intersection of alternating current zero of load current is connected between one end of the secondary winding of the transformer and said load;
   a connecting point between said zero-cross detection circuit and said load is connected to one end of an output of said rectifier; and
   said drive circuit drives said first and second switching elements, based on the output of said zero-cross detection circuit.

5. The neutral point inverter as set forth in claim 2, further comprising a second transformer with a primary winding thereof connected between said load and said transformer;
   wherein said drive circuit detects voltage which is generated across the secondary winding of said second transformer, and stops operation of said first and second switching elements when said voltage is outside a predetermined range.

6. The neutral point inverter as set forth in claim 2, further comprising a second transformer with a primary winding thereof connected between said load and said transformer;
   wherein said drive circuit detects current which flows in the secondary winding of said second transformer, and stops operation of said first and second switching elements when said current is outside a predetermined range.

7. The neutral point inverter as set forth in claim 2, wherein:
   said load is a fluorescent lamp;
   said transformer has a tap at a predetermined winding position; and
   one end of a filament of said flourescent lamp is connected to said tap so that said filament can be preheated.

8. The neutral point inverter as set forth in claim 1, wherein said inductor is a take-out winding of an autotransformer connected between said two connecting points.

9. The neutral point inverter according to claim 1, further comprising a snubber circuit connected in parallel with either one or the other of said first and second switching elements, said snubber circuit absorbing an abnormal voltage generated at said connecting point between said first and second switching elements;
   wherein voltage generated in said snubber circuit is detected, and when said voltage is outside a predetermined range, said drive circuit stops operation of said first and second switching elements.

10. The neutral point inverter according to claim 1, further comprising:
    a start circuit for supplying direct-current voltage rectified by said rectifier to said drive circuit only for a time period during which a predetermined time elapses since said alternating voltage was applied to said inverter;
    a direct-current voltage generating circuit for supplying direct-current voltage to said drive circuit, said direct-current voltage being obtained by rectifying high-frequency voltage which is generated in said load circuit by an on-off operation of said first and second switching elements; and
    a drive stop circuit for stopping the on-off operation of said first and second switching elements when said direct-current voltage obtained by said direct-current voltage generating circuit is outside a predetermined voltage range.

* * * * *